US011670467B2

(12) United States Patent
Goh et al.

(10) Patent No.: US 11,670,467 B2
(45) Date of Patent: Jun. 6, 2023

(54) SPRING-BACK FORCE ADJUSTABLE INPUT/OUTPUT DEVICE FOR AN INFORMATION HANDLING SYSTEM

(71) Applicant: Dell Products, LP, Round Rock, TX (US)

(72) Inventors: Peng Lip Goh, Singapore (SG); John Trevor Morrison, Round Rock, TX (US)

(73) Assignee: Dell Products, LP, Round Rock, TX (US)

(*) Notice: Subject to any disclaimer, the term of this patent is extended or adjusted under 35 U.S.C. 154(b) by 0 days.

(21) Appl. No.: 17/237,866

(22) Filed: Apr. 22, 2021

(65) Prior Publication Data

US 2022/0344113 A1    Oct. 27, 2022

(51) Int. Cl.
| | |
|---|---|
| *H01H 13/52* | (2006.01) |
| *G06F 3/02* | (2006.01) |
| *G06F 3/0362* | (2013.01) |
| *G06F 3/038* | (2013.01) |
| *H01H 13/14* | (2006.01) |
| *A63F 13/24* | (2014.01) |
| *G06F 3/0354* | (2013.01) |

(52) U.S. Cl.
CPC ............ *H01H 13/52* (2013.01); *A63F 13/24* (2014.09); *G06F 3/0202* (2013.01); *G06F 3/038* (2013.01); *G06F 3/0362* (2013.01); *G06F 3/03543* (2013.01); *H01H 13/14* (2013.01); *G06F 2203/0384* (2013.01); *H01H 2221/032* (2013.01); *H01H 2221/04* (2013.01)

(58) Field of Classification Search
CPC .. H01H 13/52; H01H 13/14; H01H 2221/032; H01H 2221/04; G06F 3/0202; G06F 3/03543; G06F 3/0362; G06F 3/038; G06F 2203/0384; A63F 13/24
See application file for complete search history.

(56) References Cited

U.S. PATENT DOCUMENTS

| | | | |
|---|---|---|---|
| 3,619,524 A | 11/1971 | Gillund | |
| 6,937,225 B1 | 8/2005 | Kehlstadt | |
| 10,705,629 B1* | 7/2020 | Arnold | ............... G06F 3/03547 |
| 10,928,969 B2 | 2/2021 | Hsu | |
| 10,936,091 B1* | 3/2021 | Tseng | ...................... G06F 3/038 |
| 11,301,054 B1* | 4/2022 | Drezet | .................... G06F 3/016 |
| 2001/0055002 A1 | 12/2001 | Endo | |
| 2005/0104853 A1 | 5/2005 | Sitalasai | |
| 2005/0110755 A1 | 5/2005 | Harley | |

(Continued)

*Primary Examiner* — Ariel A Balaoing
(74) *Attorney, Agent, or Firm* — Prol Intellectual Property Law, PLLC; H. Kenneth Prol

(57) ABSTRACT

An information handling system may include a processor; a data storage device; a power management unit (PMU); a spring-back force adjustable pointing device operatively coupled to communication with the processor, including: a pointing device housing; a key plate operatively coupled to the pointing device housing at a key plate hinge; a first magnet operatively coupled to the key plate; and a second magnet operatively coupled to an opposing magnet adjustment device to adjust the position of the second magnet relative to the first magnet, wherein the first magnet and second magnet have repelling poles facing each other to assist spring-back of the key plate when opposing magnets fields interact.

20 Claims, 11 Drawing Sheets

(56) References Cited

U.S. PATENT DOCUMENTS

| | | | |
|---|---|---|---|
| 2005/0170778 A1* | 8/2005 | Uchiyama | G06F 3/03543 |
| | | | 455/352 |
| 2006/0250360 A1* | 11/2006 | Goodwin | G06F 3/0383 |
| | | | 345/163 |
| 2008/0106523 A1 | 5/2008 | Conrad | |
| 2008/0297328 A1* | 12/2008 | Crawford | A63F 13/285 |
| | | | 340/407.2 |
| 2012/0299832 A1 | 11/2012 | Peterson | |
| 2015/0286295 A1 | 10/2015 | Pepe | |
| 2015/0302966 A1* | 10/2015 | Soelberg | H01F 7/0273 |
| | | | 463/37 |
| 2017/0220139 A1* | 8/2017 | Forde | G06F 3/03543 |
| 2019/0146600 A1* | 5/2019 | Tsai | G06F 3/0202 |
| | | | 345/163 |
| 2020/0012357 A1* | 1/2020 | Lien | G06F 3/016 |
| 2020/0167008 A1 | 5/2020 | Wang | |
| 2021/0132707 A1* | 5/2021 | Chen | G06F 3/03543 |

* cited by examiner

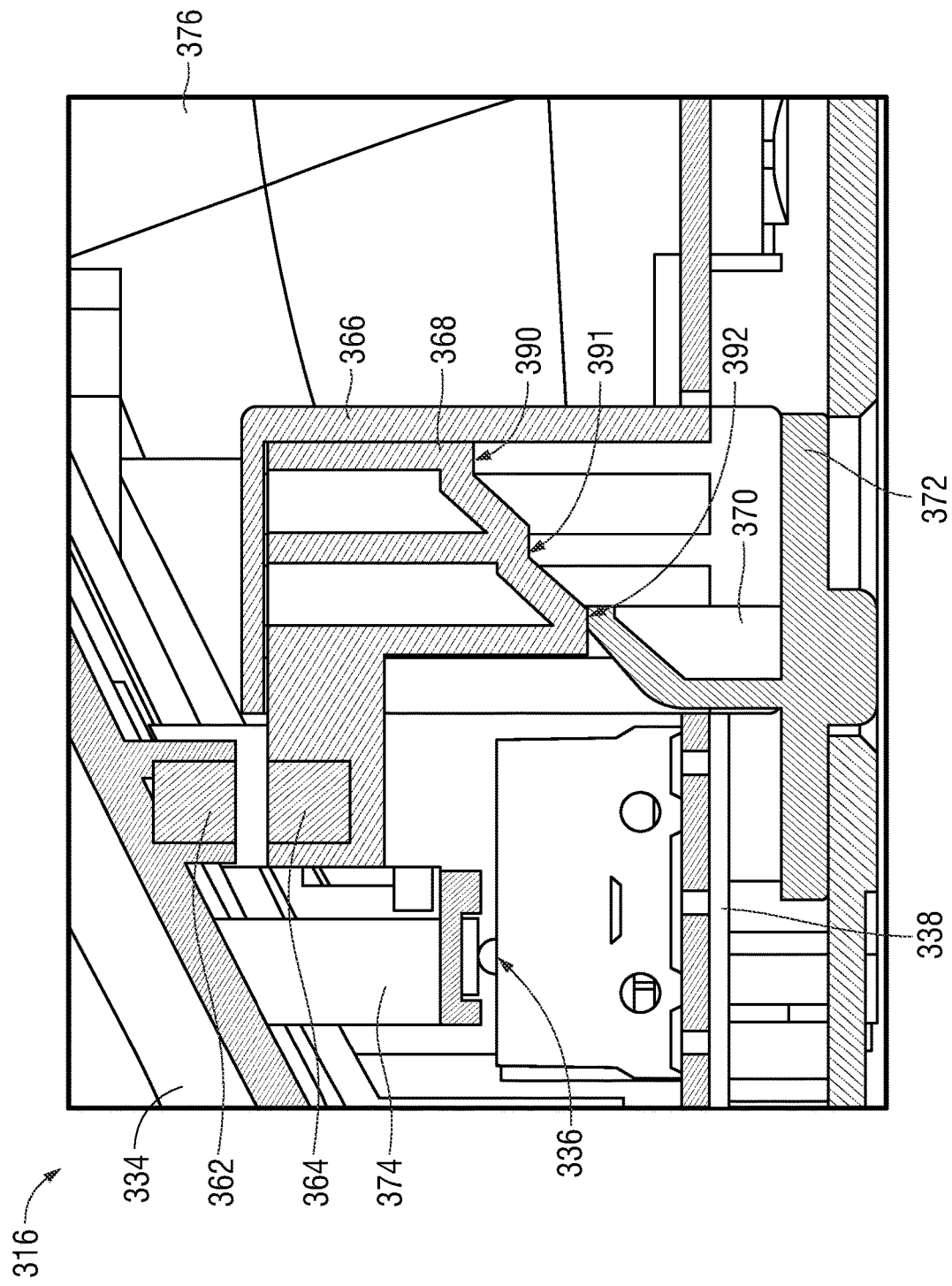

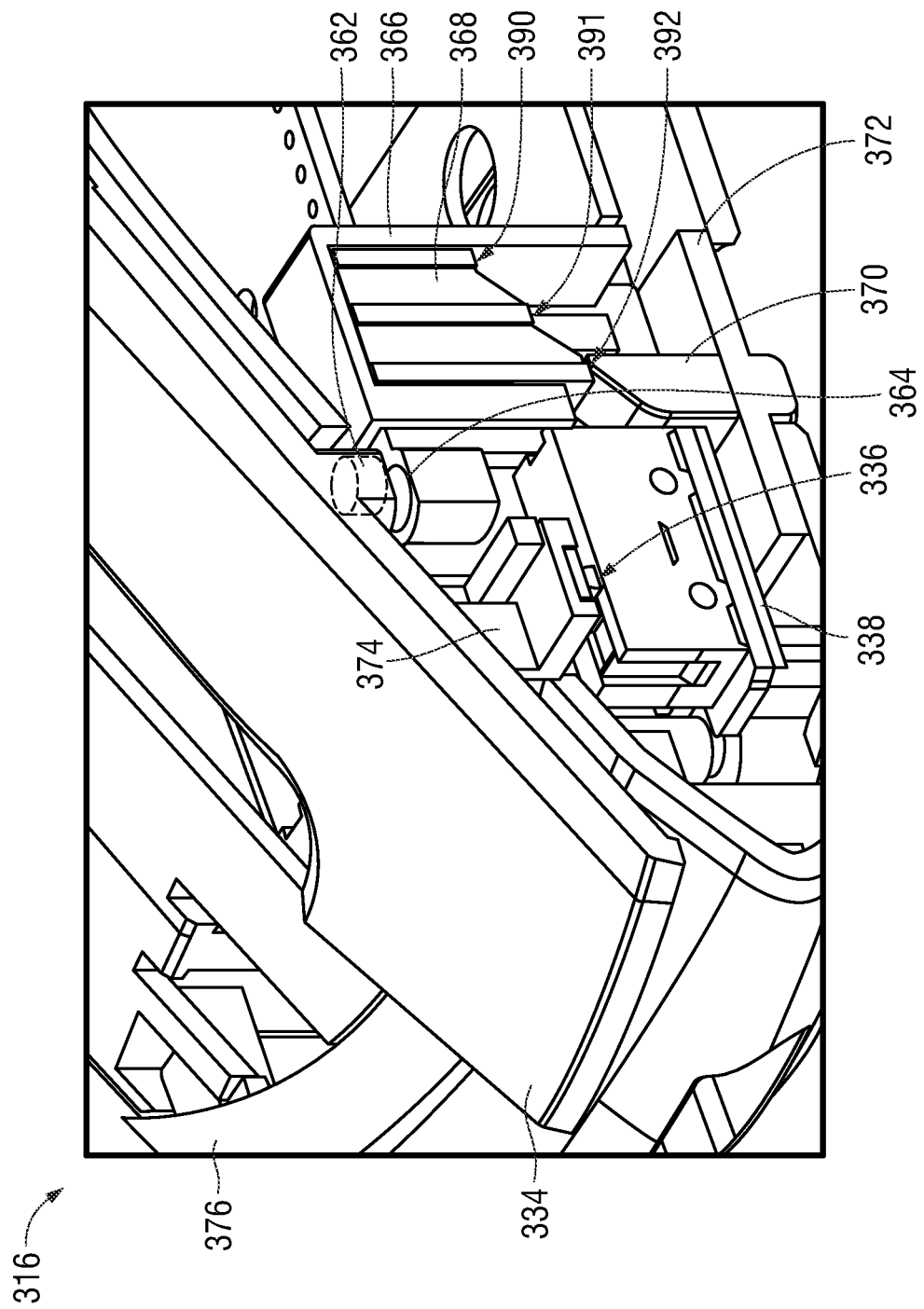

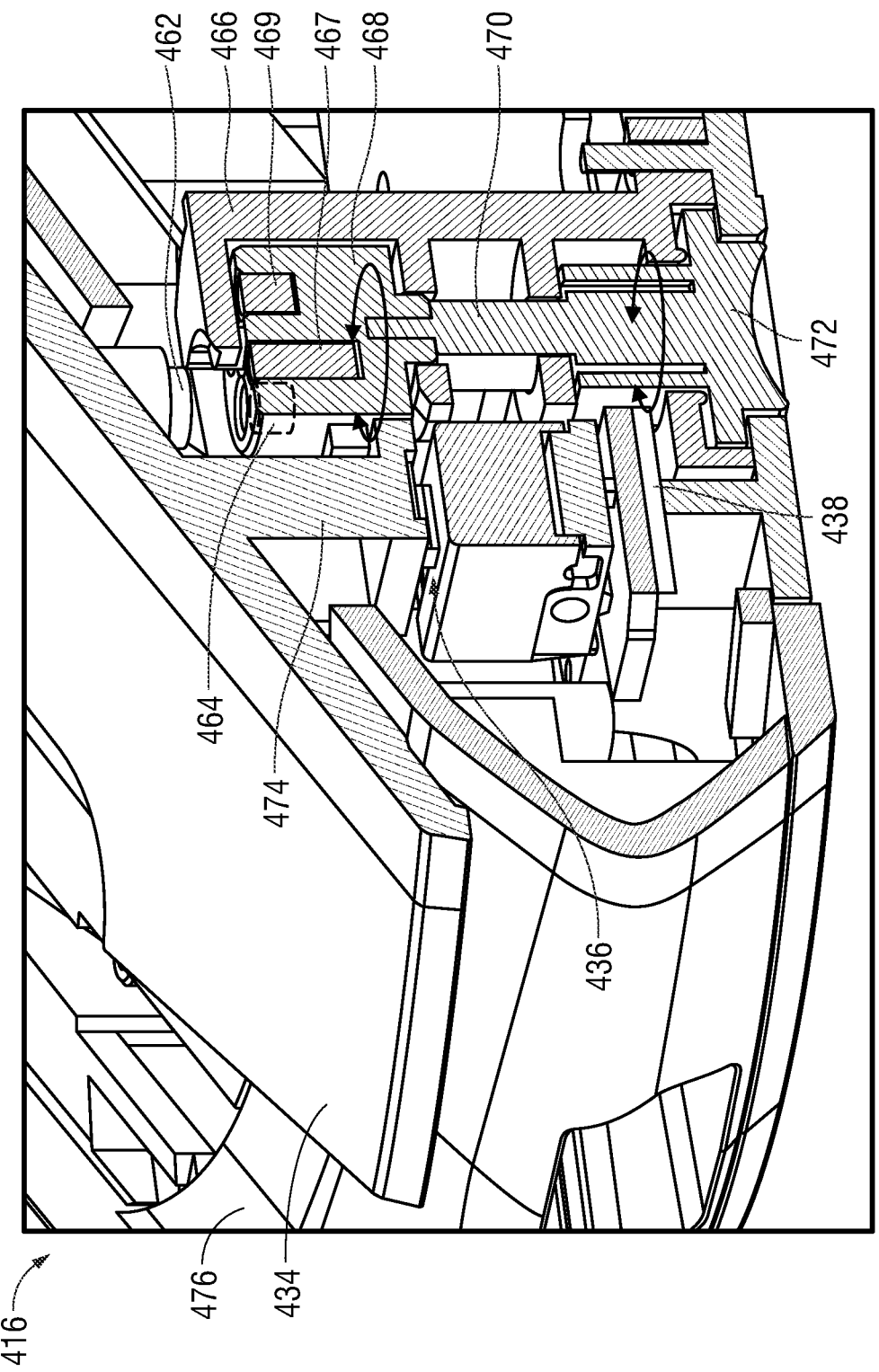

SPRING-BACK FORCE ADJUSTABLE INPUT/OUTPUT DEVICE FOR AN INFORMATION HANDLING SYSTEM

FIELD OF THE DISCLOSURE

The present disclosure generally relates to input/output (I/O) device functionalities for an information handling system. The present disclosure more specifically relates to a quicker response time to an actuated key or button on an I/O device such as a mouse.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more gaming applications. Further, the information handling system may include a mouse or other pointing device used by the user to provide input to the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3B is a side, partial cut-away view of a slidable opposing magnet adjustment device of a spring-back force adjustable pointing device according to another embodiment of the present disclosure;

FIG. 3D is a perspective, cut-away view of a slidable opposing magnet adjustment device of a spring-back force adjustable pointing device according to another embodiment of the present disclosure;

FIG. 4C is a perspective, cut-away view of a rotating barrel housing-type opposing magnet adjustment device of a spring-back force adjustable pointing device according to an embodiment of the present disclosure;

The use of the same reference symbols in different drawings may indicate similar or identical items.

DETAILED DESCRIPTION OF THE DRAWINGS

Figure 1:
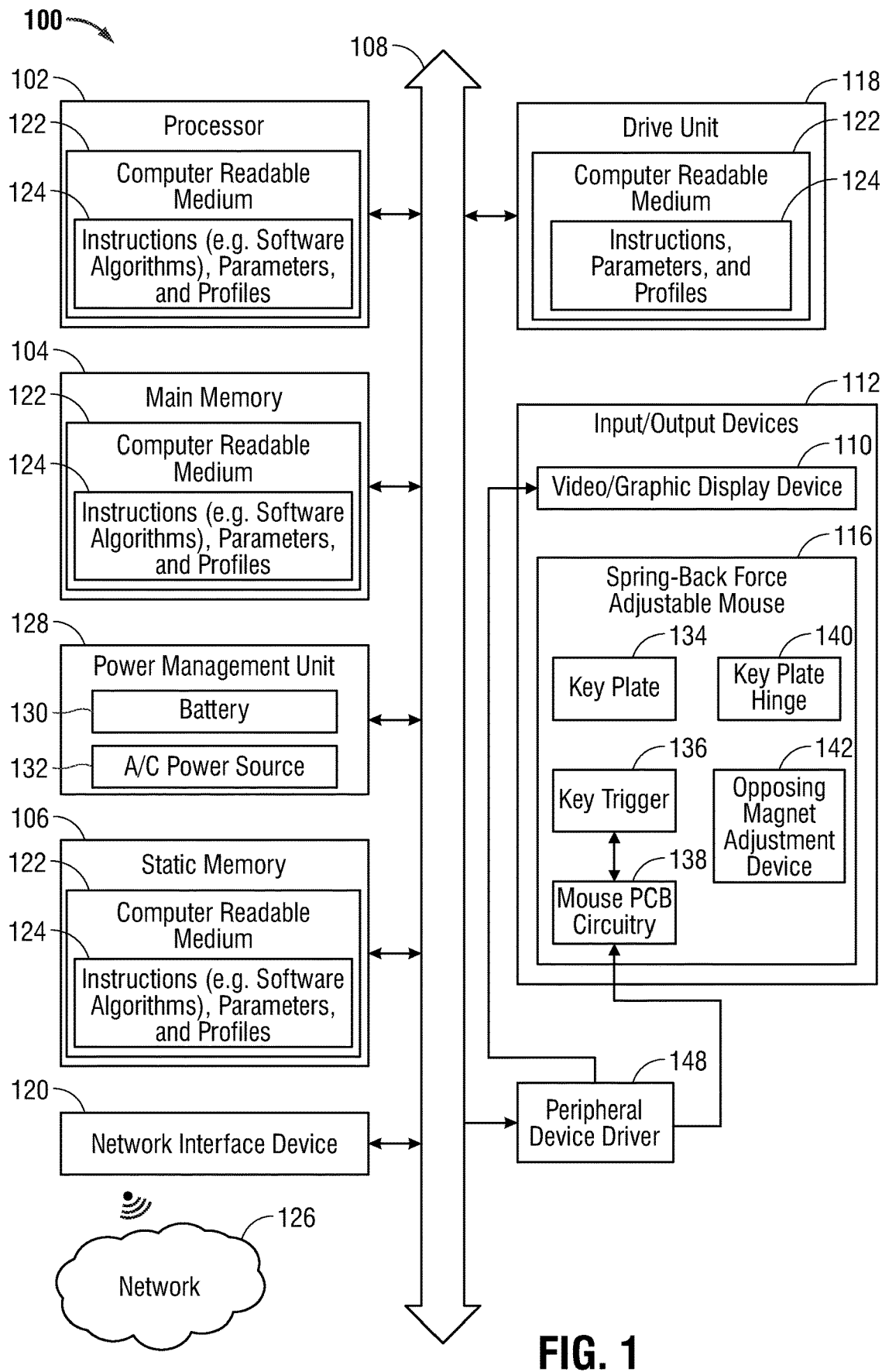
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for an information handling system, that includes a processor, a data storage device, and a power management unit, used to operatively communicate with a spring-back force adjustable pointing device as described herein. The embodiments of the present disclosure also describe the spring-back force adjustable pointing device that includes an opposing magnet adjustment device. In an embodiment, the opposing magnet adjustment device may adjust a distance between two magnets. In this embodiment, a first magnet may be operatively coupled to a key plate of the spring-back force adjustable pointing device and a second magnet is operatively coupled to a portion of the opposing magnet adjustment device. In this embodiment, the magnetic field from the first magnet may oppose the magnetic field of the second magnet. In these embodiments, the magnetic fields of the first magnet and second that face each other may be "like" poles in that the magnetic fields of the magnets repel each other or are in opposition to each other. In common vernacular, opposing fields of the first magnet and second magnet are described as have similar poles facing each other such as the "north poles" of each magnet facing each other or the "south poles" of the magnets facing each other. It is appreciated that the magnetic fields of the first magnet and second magnet may have differing magnetic field strengths (ampere per meter or A/m).

In another embodiment, the opposing magnet adjustment device may adjust which of a plurality of magnets are placed adjacent or within a magnetic field of an opposing magnet to allow the magnetic fields of the magnets to interact with each other. In this embodiment, a first magnet may be operatively coupled to a key plate of spring-back force adjustable pointing device. Here, the opposing magnet adjustment device may include a barrel housing that includes a plurality of individual magnets that, when the barrel housing is rotated, allows the magnetic field of one of the plurality of individual magnets to interact with the magnetic field of the first magnet operatively coupled to the key plate. Again, in this embodiment, the magnetic field from the first magnet may oppose the magnetic fields of each of the plurality of individual magnets when the magnetic fields of each of the plurality of individual magnets individually are oriented to interact within the magnetic field of the first magnet. In these embodiments, the magnetic fields of the first magnet and each of the plurality of individual magnets that face each other may be "like" poles in that the magnetic fields of the magnets repel each other or are in opposition to each other. It is appreciated that the magnetic fields of the first magnet and each of the plurality of individual magnets may have differing magnetic field strengths (ampere per meter or A/m).

By operation of the opposing magnet adjustment devices described herein, the magnetic opposition between magnets may be increased or decreased such that the key plate of the spring-back force adjustable pointing device may increase or decrease, respectively, the spring-back force after a user has pressed down on the key plate. Where the spring-back force is increased, the key plate may be actuated by a user more rapidly due to the ability of the key plate to return to a position the key plate was in prior to the actuation of the user. This may be advantageous for certain users such as garners or other types of users who engage in gaming applications at the information handling system. When garners rapidly press the key on a pointing device (aka: a mouse) to engage continuous firing, for example, in a shooter game, these garners frequently face the problem of click detection or keyplate actuation detection not keeping up with the speed of the movement of the user's finger. This results in missing or skipped intended actuations. The present embodiments of the spring-back force adjustable pointing device allow for an increase in spring-back of the key plate such that all or more of the actuations from the user's finger may be detected.

FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT information handling system, wearable information handling system, a set-top box (STB), a mobile information handling system, a palmtop computer, a laptop computer, a desktop computer, a communications device, an access point (AP), a base station transceiver, a wireless telephone, a control system, a camera, a scanner, a facsimile machine, a printer, a personal trusted device, a web appliance, or any other suitable machine capable of executing a set of instructions (sequential or otherwise) that specify actions to be taken by that machine, and can vary in size, shape, performance, price, and functionality.

In an example embodiment, the information handling system 100 may include a laptop or desktop that may include a gaming-type information handling system 100 that executes a gaming application for example. The gaming application may include any computer code that is executed by a processor 102 of the information handling system 100 in order to allow the user to engage with a gaming environment via input/output (I/O) devices 112 such as the spring-back force adjustable pointing device 116, a keyboard 114, a video/graphics display device 110 or any other input or output device. The spring-back force adjustable pointing device 116, as described herein, may allow a user to interact with the graphics and images presented on the video/graphics display device 110. The spring-back force adjustable pointing device 116 may be in example embodiments a mouse pointing device, a trackball pointing device, or other pointing device to move a cursor or other items on a video/graphics display device 110 and may include one or more buttons for selection of displayed items or execution of actions in a software application. In order to do so, the spring-back force adjustable pointing device 116, similar to the keyboard 114 and video/graphics display device 110, may be operatively coupled to the processor 102 via a peripheral device driver 148. These components may further implement a bus 108 that transmits data signals to and from the spring-back force adjustable pointing device 116 and other input/output devices 112. Each of these components (e.g., the video/graphics display device 110, the spring-back force adjustable pointing device 116, the keyboard, and the processor 102) may be powered by an A/C power source 132 and/or a battery 130 via execution of the power management unit (PMU) 128.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video, or data communication. For example, an information handling system 100 may be any mobile or other information handling system capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU) such as processor 102, a graphics processing unit (GPU), hardware or software control logic, or any combination thereof. Additional components of the information handling system 100 can include one or more storage devices, one or more communications ports for communicating with external devices, as well as, various input and output (I/O) devices 112, such as the keyboard 114, the spring-back force adjustable pointing device 116, a video/graphics display device 110, or any combination thereof. The information handling system 100 can also include one or more buses 108 operable to transmit communications between the various hardware components. Portions of an information handling system 100 may themselves be considered information handling systems 100.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), graphics processing unit (GPU), control logic or some combination of the same. Any of the processing resources may operate to execute code that is either firmware or software code. Moreover, the information handling system 100 can include memory such as main memory 104, static memory 106, computer readable medium 122 storing instructions 124, and various application such as gaming applications, and drive unit 116 (volatile (e.g., random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices 112.

As described, the information handling system 100 may include a video/graphics display device 110. The video/graphics display device 110 in an embodiment may function as a liquid crystal display (LCD), an organic light emitting diode (OLED), a flat panel display, or a solid-state display. Additionally, the information handling system 100 may include an input device 112, such as a cursor control device (e.g., touchpad, or gesture or touch screen input, a keyboard 114 and the spring-back force adjustable pointing device 116).

The network interface device (NID) 120 of the information handling system 100 can provide connectivity to a network 126, e.g., a wide area network (WAN), a local area network (LAN), wireless local area network (WLAN), a wireless personal area network (WPAN), a wireless wide area network (WWAN), or other networks. Connectivity may be via wired or wireless connection. The NID 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one NID 120 may operate two or more wireless links.

The NID 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in one or more bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. The NID 120 in an embodiment may transceive within radio frequencies associated with the 5G New Radio (NR) Frequency Range 1 (FR1) or Frequency Range 2 (FR2). NRFR1 may include radio frequencies below 6 GHz, associated with 4G LTE and other standards predating the 5G communications standards now emerging. NRFR2 may include radio frequencies above 6 GHz, made available within the now emerging 5G communications standard. Communications within NRFR1 may be enabled through the use of either an evolved Node B (eNodeB) executing an evolved packet core of an existing LTE system, or a Next Generation Node B (gNodeB) executing the next generation packet core of the 5G cellular standard.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video, or data over the network 128. Further, the instructions 124 may be transmitted or received over the network 128 via the network interface device or NID 120.

The information handling system 100 can include a set of instructions 124 that can be executed to cause the computer system to perform any one or more of the methods or computer-based functions disclosed herein. For example, instructions 124 may execute a peripheral device driver associated with the spring-back force adjustable pointing device 116 or other aspects or components. In various embodiments herein, the instructions 124 may execute any type of application including, as an example presented throughout herein, gaming applications. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to the peripheral device driver 148 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some of or all the peripheral device driver 148 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The peripheral device driver 148 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium 122 can include a solid-state memory such as a memory card or other package that houses one or more non-volatile read-only memories. Further, the computer-readable medium 122 can be a random-access memory or other volatile re-writable memory. Additionally, the computer-readable medium 122 can include a magneto-optical or optical medium, such as a disk or tapes or other storage device to store information received via carrier wave signals such as a signal communicated over a transmission medium. Furthermore, a computer readable medium 122 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium 122 or a distribution medium and other equivalents and successor media, in which data or instructions may be stored.

The information handling system 100 may further include a power management unit (PMU) 128 (a.k.a. a power supply unit (PSU)). The PMU 128 may manage the power provided to the components of the information handling system 100 such as the processor 102, a cooling system such as a bank of fans, one or more drive units 114, a graphical processing unit (GPU), the video/graphic display device 110, and other components that may require power when a power button has been actuated by a user. In an embodiment, the PMU 128 may be operatively coupled to the bus 108 to provide power management data and send or receive instructions relating to power management functions. The PMU 128 may regulate an electrical connection to battery power 130 or alternating current (A/C) power sources 132 to provide power to the information handling system 100. In an embodiment, the battery 130 may be charged via the A/C power adapter 132 and provide power the to the components of the information handling system 100 when A/C power from the A/C power adapter 132 is removed.

As described, the information handling system 100 may be operatively coupled to the spring-back force adjustable pointing device 116. The spring-back force adjustable pointing device 116 may be any pointing device that allows a user to interact with graphics and images presented at the video/graphics display device 110 and, in some examples, do so by moving of cursor across the video/graphics display device 110. In an embodiment, the spring-back force adjustable pointing device 116 is in the form of a computer mouse. However, although the present specification describes the spring-back force adjustable pointing device 116 as having a form of a computer mouse, the present specification contemplates that the principles and mechanics associated with the functioning of the spring-back force adjustable pointing device 116 may be applies to other input devices such as a joystick, a stylus, a game controller, trackball pointer, and the like.

The spring-back force adjustable pointing device 116 includes a pointing device printed circuit board (PCB) circuitry 138. The pointing device PCB circuitry 138 may include circuitry used to receive input from any switch or key trigger 136 on the spring-back force adjustable pointing device 116 indicative of an actuation by a user of a key plate 134 operatively coupled to a housing of the spring-back force adjustable pointing device 116. The pointing device PCB circuitry 138 may also include any circuitry that relays these signals received from the key trigger 136 to a processor 102 of the information handling system 100. In an embodiment, the pointing device PCB circuitry 138 may include wireless communication devices that operates via Bluetooth, WiFi, or other wireless communication protocols to communicate with the peripheral device driver 148 of the information handling system 100. In other embodiments, the pointing device PCB circuitry 138 may relay signals via wired connection to an information handling system 100 and a bus 108 such as via a USB or other connection. In an embodiment, the pointing device PCB circuitry 138 may include any circuitry used to relay power from a power source such as a battery within the spring-back force adjustable pointing device 116 or a power source at the information handling system 100 relayed to the spring-back force adjustable pointing device 116 via a wire.

In the embodiments described herein, a key plate 134 may be operative coupled to a housing of the spring-back force adjustable pointing device 116 via a key plate hinge 140. In this embodiment, the key plate hinge 140 may be formed by a pin shaft on the housing of the spring-back force adjustable pointing device 116 and a key plate barrel formed on the key plate 134. In this embodiment, the pin shaft may be placed within a hole formed in the key plate barrel so that the key plate 134, at the key plate hinge 140, may be allowed to rotate about the key plate hinge 140. In an embodiment, the key plate 134 may also include a key plate stop that prevents or limits movement of the key plate 134 away from the housing of the spring-back force adjustable pointing device 116 after a certain limit distance in a direction away from the housing of the spring-back force adjustable pointing device 116 is reached. In this embodiment, the housing of the spring-back force adjustable pointing device 116 also prevents the key plate 134 from rotating in an opposite direction thereby limiting, to a certain distance, the rotation of the key plate 134 about the key plate hinge 140. This distance may be the distance a user of the spring-back force adjustable pointing device 116 may press the key plate 134 for the spring-back force adjustable pointing device 116 to receive an indication of a "click" of the key plate 134. As described herein, this "click" is indicative of an actuation of the key plate 134 that is received at the pointing device PCB circuitry 138 via the key trigger 136 as a signal. In this embodiment, the signal indicates that the cursor at the video/graphics display device 110 is selecting an image element or otherwise interacting with the graphics or images presented on the video/graphics display device 110 or executing a command of a software application. In the context of a gaming application being executed on the information handling system 100, the click may be an interaction of the user during a gaming experience such as firing a gun, interacting with a virtual object, among other actions.

As described herein, a user of previous pointing devices may want to rapidly click a key plate in order to increase, for example, shots produced by a virtual gun in the gaming system or other rapid actions that may occur during gameplay. When gamers rapidly press the key on these previous pointing devices (aka: a mouse) to engage continuous firing, for example in a shooter game, these gamers frequently face the problem of click detection or keyplate actuation detection not keeping up with the speed of the movement of the user's finger. This results in missing or skipped intended actuations. It is determined that these missing or skipped detections are caused by, at least, a cantilever hinge on these previous pointing devices, the spring mechanism used to return the key plate to its original position prior to actuation by the user. The cantilever hinge on these previous pointing devices consists of a fixed hinge such as formed out of the plastic housing of the pointing device. Here, due to the elastic nature of the keyplate cantilever construction of plastic, metal, or similar materials in these previous pointing devices, this deformation has a linear force/displacement relationship making a trigger force almost the same as spring back force. This relationship does not allow spring back force to increase significantly without increasing stiffness of the keyplate making it much harder to press and trigger. Further, this type of construction does not allow any trigger and spring back force to be adjusted. In order to compensate for the deficiencies of these previous pointing devices, a compression spring formed between the key plate and the housing of the pointing device may be included. Still, the force displacement curve of these types of pointing devices is linear and the inclusion of, for example, stiffer plastics for the key plate or stiffer springs used only adds to the force necessary to press and actuate the key. Even further, where certain plastics are used, the elasticity of the plastic may change over time thereby increasing the unreliability of the actuation of the key plate. Similarly, where a certain type of material is used for the spring, the elasticity of the such a material (e.g., metal, plastic, etc.) may change over time thereby increasing the unreliability of the spring-back force exerted by the spring on the key plate.

The spring-back force adjustable pointing device 116 solves some of these, and other, issues with the previous pointing devices. It does this by the inclusion of a key plate hinge 140 and an opposing magnet adjustment device 142 with opposing magnets to assist a spring-back force. As described herein, the key plate hinge 140 may be formed by a pin shaft on the housing of the spring-back force adjustable pointing device 116 and a key plate barrel formed on the key plate 134. In this embodiment, the pin shaft may be placed within a key plate barrel formed in the key plate 134 so that the key plate 134, at the key plate hinge 140, may be allowed to rotate about the key plate hinge 140. Therefore, the key plate hinge 140 does not rely on a specific type of material to impart a spring force or return force on the key plate 134 but instead allows the key plate 134 to move or rotate about the key plate hinge 140 freely or as limited by the key plate hinge 140.

The opposing magnet adjustment device 142 may include any device that includes a first magnet operatively coupled to the underside of the key plate 134. In these embodiments, a second magnet is placed or selectively arranged below the first magnet. In these embodiments of the opposing magnet adjustment device 142, the magnetic fields of the first magnet and second face each other such that "like" poles of the magnets repel each other or are in opposition to each other. In common vernacular, opposing fields of the first magnet and second magnet are described as have similar poles facing each other such as the "north poles" of each magnet facing each other or the "south poles" of the magnets facing each other. It is appreciated that the magnetic fields of the first magnet and second magnet may have differing magnetic field strengths (ampere per meter or A/m). By arranging these magnets in this way, a non-linear exponential force displacement relationship between the two repelling magnets is realized when the keyplate moves down during an actuation by a user. This non-linear exponential force displacement relationship creates a spring-back force on the key plate 134 without substantially increasing the initial force required to click or trigger the key plate 134 by the user. By way of example and depending on the magnetic field produced by the two magnets, a gap of 1 mm between the first magnet and second magnet may produce a key plate 134 pressing force of 68 grams such that when the key plate 134 is pressed down by a distance of 0.5 mm, a repelling or spring-back force exerted on the key plate 134 may increase to 108 grams. These actuation forces and repelling forces may be based on the individual magnetic fields produced by the first and second magnets and these distances and gram forces are meant as examples only. The present specification contemplates that different actuation forces and repelling forces may be achieved using different types of magnets with different magnetic field strengths, or different distances.

In an embodiment, the opposing magnet adjustment device 142 may be a sliding knob-type opposing magnet adjustment device 142. In this embodiment, the first magnet may be operatively coupled to the underside (e.g., opposite a surface of the key plate 134 where a user touches) of the key plate 134. A second magnet, in this embodiment, may be operatively coupled to a magnet arm. The magnet arm moves the second magnet closer to or further away from the first magnet via actuation by the user of a slid-knob operatively coupled to a lifter. As the slid-knob is moved, the lifter interfaces with an underside surface of the magnet arm. Due to the non-planar surface of the magnet arm, the further the slide knob and lifter are moved the closer the second magnet moves closer to or further away from the first magnet. This allows a user to selectively increase (second magnet closer to the first magnet) or decrease (second magnet relatively further away from the first magnet) the spring-back force applied to the key plate 134. In some embodiments, the underside of the magnet arm may include a series of plateaus that the magnet arm may rest against the lifter so the distance from the second magnet and first magnet remains unchanged during operation of the spring-back force adjustable pointing device 116.

In another embodiment, the opposing magnet adjustment device 142 may be a rotating barrel housing-type opposing magnet adjustment device 142. In this embodiment, the first magnet is operatively coupled to an underside of the key plate 134. Here, a barrel housing may be placed below the first magnet and may include one or more magnets operatively coupled to the rotating barrel. Each of these magnets operatively coupled to the rotating barrel may be different sizes, may be made of different materials, and/or located at different vertical heights within the rotating barrel relative to each other. The rotating barrel may be operatively coupled to a rotating shaft and rotating knob. The rotating shaft may be sufficiently long to extend out of the bottom of the housing of the spring-back force adjustable pointing device 116 and terminate at the rotating knob. In this embodiment, the user may selectively change which magnet among the one or more magnets operatively coupled to the rotating barrel interacts with the first magnet. The user may do this by selectively turning the knob and, thereby, rotating the barrel in order to align a specific magnet operatively coupled to the rotating barrel with the first magnet that is operatively coupled to the underside of the key plate 134. In this manner, the user may either increase or decrease the spring-back force applied to the key plate 134 based on which magnet is interacting with the first magnet.

In an embodiment, the sliding knob-type opposing magnet adjustment device 142 and rotating barrel housing-type opposing magnet adjustment device 142 may be implemented together to switch both the type, size, and magnetic flux of a magnet placed below the first magnet that is operatively coupled to the underside of the key plate 134. In this embodiment, the barrel of the rotating barrel housing-type opposing magnet adjustment device embodiment may be moved vertically via the lifter arm of the sliding knob-type opposing magnet adjustment device embodiment. Here, the rotating shaft of the rotating barrel housing-type opposing magnet adjustment device embodiment may be telescopic allowing the length of the rotating shaft to increase or decrease as the barrel is moved up and down. This hybrid of these embodiments may allow for additional granularity in selecting the magnetic field that is applied to the first magnet that is operatively coupled to the underside of the key plate 134. This increases the customizability of the spring-back force adjustable pointing device 116 for each type of user operating each type of application being executed on the information handling system 100.

In any of the embodiments of the opposing magnet adjustment device 142 described herein, any of the opposing magnets used may be a ferromagnet or other types of permanent magnets, an electromagnetic magnet, or an electropermanent magnet. In the embodiments where the magnets are permanent magnets, the permanent magnets may be made of iron, nickel and cobalt and their alloys, some alloys of rare-earth metals, and some naturally occurring minerals such as lodestone. In the embodiments where the opposing magnets are electromagnets, the pointing device PCB circuitry 138 may be used to apply direct current (DC) to a metal forming the magnet in order to produce the electromagnetic field. In this embodiment, the power source used to provide the DC to the metal may originate from a battery formed within the spring-back force adjustable pointing device 116 or from a power source at the information handling system 100 and provided to the pointing device PCB circuitry 138 via an electrical wire interface between the spring-back force adjustable pointing device 116 and the information handling system 100. In the embodiment where one or more of the opposing magnets is an electropermanent magnet, the pointing device PCB circuitry 138 may be used to apply a current pulse to a wire winding around part of the metal forming the magnet in order to alter the magnetic field orientation of a low-coercivity magnet relative to an adjacent high-coercivity magnet. In this embodiment, the electropermanent magnet includes two sections: a first section that is a relatively high coercivity magnetic material and the other that includes a relatively low coercivity magnetic material. When the current pulse is applied to the wire winding around one of these magnetic materials, the direction of magnetization (e.g., the polarity of the magnetic field) may be switched to align or oppose the other magnetic material depending on direction of the applied current pulse. In this embodiment, the application of the current pulse produces a net external magnetic field across its poles such that the polarity may be turned on or off. In this embodiment, the battery may be used to apply this current pulse so that the battery does not apply a current to the magnets like in the electromagnetic embodiment described herein.

In an embodiment, the spring-back force adjustable pointing device 116 includes a key trigger 136 that is operatively coupled to the pointing device PCB circuitry 138. The key trigger 136 may any trigger or switch that is actuated by a physical force applied to an arm or trigger point on the key trigger 136. In the context of the present specification, the key trigger 136 receives this applied physical force from the actuation of the key plate 134 by a user. In these embodiments, a trigger arm may be formed on the underside of the key plate 134 and made to extend towards the key trigger 136 such that actuation of the key plate 134 by the user causes the trigger arm to contact the key trigger 136. This contact causes the key trigger 136 to send a signal to the pointing device PCB circuitry 138 that is recorded as a "click" or actuation signal.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
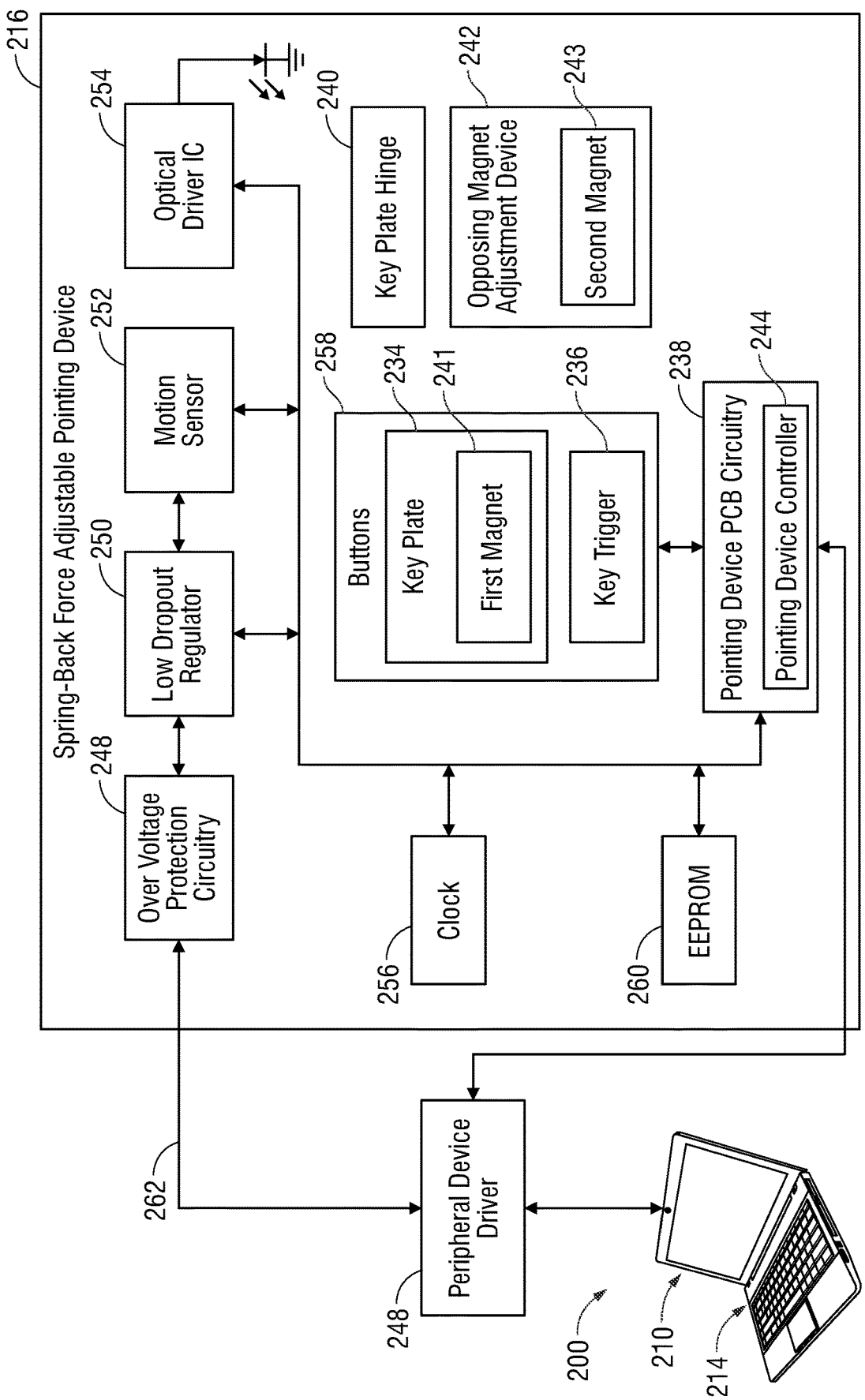
FIG. 2 is a block diagram illustrating an information handling system and a spring-back force adjustable pointing device according to an embodiment of the present disclosure.

FIG. 2 is a block diagram illustrating an information handling system 200 and a spring-back force adjustable pointing device 216 according to an embodiment of the present disclosure. In an embodiment, the information handling system 200 may be operatively coupled to the spring-back force adjustable pointing device 216 via a wired or wireless connection 262. In the embodiments described herein, the wireless connection 262 may be any type of wireless communication protocol including WiFi, near field communication (NFC), and the like. In the embodiment where NFC is used, any type of frequency may be used to transmit data to and from the information handling system by a network interface device present on the pointing device PCB circuitry 238 of the spring-back force adjustable pointing device 216. These frequencies may include, for example, 13.56 MHz, industrial, scientific, and medical (ISM) frequencies, as well as those frequencies associated with LTE and 5G communications such as 2.45 GHz, 5.8 GHz, and frequencies above 6 GHz.

In an embodiment, the spring-back force adjustable pointing device 216 may be operatively coupled to the information handling system 200 through a stand-alone keyboard (not shown) or docking station that helps to relay signals from the processor of the information handling system 200 to the spring-back force adjustable pointing device 216. In this embodiment, operatively coupling the spring-back force adjustable pointing device 216 to the information handling system 200 through the keyboard or docking station may reduce the number of ports (e.g., USB ports) necessary to be installed and utilized at the information handling system 200.

In the embodiment where the spring-back force adjustable pointing device 216 is operatively coupled to the information handling system via a wireless connection such as Bluetooth, WiFi, near field communication (NFC) or similar connection, the information handling system 200 and spring-back force adjustable pointing device 216 may each include a transceiver to send and receive input and output data according to the embodiments described herein. In this embodiment, the transceiver of the spring-back force adjustable pointing device 216 may be included as part of the pointing device PCB circuitry 238. The spring-back force adjustable pointing device 216 may further include a power source such as a lithium-ion battery used to power the components of the spring-back force adjustable pointing device 216 during operation.

As described, the information handling system 200 may include a video/graphics display device 210 to provide output to the user in the form of a visual display. Additionally, the information handling system 200 may include a keyboard 214 to receive input from a user via one or more keys. FIG. 2 depicts the information handling system 200 as a laptop-type information handling system. However, the present specification contemplates that the information handling system 200 may be any type including a desktop-type information handling system with a physically separate but operatively coupled video/graphics display device 210 and keyboard 214 in other embodiments.

In the context of the present specification, the video/graphics display device 210 presents, to a user, graphics, video, text, and other images related to the execution of an application by the processor of the information handling system 200. In an embodiment, these applications may include word processing applications, spreadsheet generation application, a web browsing application, audio/video playback application, and a gaming application. In the context of the present specification, the example of a gaming application is used to describe any functioning of the spring-back force adjustable pointing device 216 as it interacts with the information handling system 200. This gaming application, when executed, may present a gaming environment. In the embodiments described herein, the gaming environment displays certain environmental characteristics and gaming action events. As discussed herein, these environmental characteristics may include objects, avatars, or gaming actions presented to the user. By way of example, the gaming application may be a first-person shooter gaming application. In this example, a character avatar may not be entirely shown on the screen but for some arms that may hold a gun, weapon, kit, or other object that the user may use to interact with other objects within the gaming environment. For example, the user may provide input to the information handling system 200 via the spring-back force adjustable pointing device 216 to move the avatar throughout the gaming environment, interact with an object in the avatar's hand, shoot a gun, swing a weapon, or touch certain other objects within the gaming environment such as snow, water, sand, and the like. Other types of gaming environments are contemplated herein such as those where the avatar is completely viewable by the user. The present specification contemplates that these other types of gaming environments and any specific example presented herein is not meant to limit the scope of the description. For ease of understanding, the examples presented herein may refer specifically to the first-person gaming environment described here.

In an embodiment, the spring-back force adjustable pointing device 216 may include over voltage protection circuitry 248. The over voltage protection circuitry 248 may prevent any spikes in voltage from damaging the other components of the spring-back force adjustable pointing device 216 during operation. The over voltage protection circuitry 248 may include, in an embodiment, any number of fuses, resistors, capacitors, or other circuit that prevents any spikes in voltage from reaching the other components of the spring-back force adjustable pointing device 216.

The spring-back force adjustable pointing device 216 may also include a low dropout regulator 250 in an embodiment. The low dropout regulator 250 may be used to regulate an output voltage to the pointing device controller 244 and other components within spring-back force adjustable pointing device 216. The spring-back force adjustable pointing device 216 may regulate the voltage provided to these other components even when the voltage supply is close in value to the output voltage.

The spring-back force adjustable pointing device 216 may also include a motion sensor 252. During operation, the user may move the spring-back force adjustable pointing device 216 in order to move a cursor or cause an avatar within the gaming environment to move. In an embodiment, the motion sensor 252 may include any device or devices that detect movement of the spring-back force adjustable pointing device 216 in order to place the spring-back force adjustable pointing device 216 in a "wake" state that activates an active translation detection device. In an embodiment, the motion sensor 252 is an accelerometer. In an embodiment, the motion sensor 252 may interact with an optical driver integrated circuit (IC) 254. The optical driver IC 254 may include a light emitting diode (LED) and a series of photodiodes. During operation, the motion sensor 252 may cause the optical driver IC 254 to be activated such that the photodiodes detect the light emitted from the LED. In this embodiment, the optical driver IC 254 may detect the movement of the spring-back force adjustable pointing device 216 relative to the underlying surface. Although the present specification describes an optical driver IC 254 used to detect the movement of the spring-back force adjustable pointing device 216, the present specification contemplates that other devices may be used such as a ball and roller system, a roller system, a LED detection system, and a gyroscopic system.

In an embodiment, input from the motion sensor 252 and optical driver IC 254 may be received at the pointing device controller 244 along with other inputs from one or more buttons 258 formed at the spring-back force adjustable pointing device 216. These buttons 258 may each include a key plate 234 and a key trigger 236 as described herein. These buttons 258 may be used by a user to make selections on a graphical user interface (GUI) at the video/graphics display device 210 or receive software application commands from a user. In specific embodiments, the buttons 258 may include a left-click button, a right-click button, and any other side buttons placed at a thumb location on the spring-back force adjustable pointing device 216. In an embodiment, the spring-back force adjustable pointing device 216 may also include a roller wheel to, in an embodiment, allow the user to scroll up and down a GUI. Via actuation of the buttons 258, the key plate 234 is forced down by the user and a trigger arm (not shown) is made to contact the key trigger 236 causing a signal to be sent to the pointing device PCB circuitry 238.

The pointing device controller 244 may be operatively coupled to an EEPROM 260 that may be used to, at least temporarily, store data such as signal data to be used by the pointing device controller 244. A clock 256 may also be used to synchronize the transmission of the signals sent by the pointing device controller 244 to the processor of the information handling system 200.

In the embodiments described herein, a key plate 234 may be operative coupled to a housing of the spring-back force adjustable pointing device 216 via a key plate hinge 240. In this embodiment, the key plate hinge 240 may be formed by a pin shaft on the housing of the spring-back force adjustable pointing device 216 and a key plate barrel formed on the key plate 234. In this embodiment, the pin shaft may be placed within a formed in the key plate barrel so that the key plate 234, at the key plate hinge 240, may be allowed to rotate about the key plate hinge 240. In an embodiment, the key plate 234 may also include a key plate stop that prevents the key plate 234 from moving away from the housing of the spring-back force adjustable pointing device 216 after a certain distance in a direction away from the housing of the spring-back force adjustable pointing device 216 is reached. In this embodiment, the housing of the spring-back force adjustable pointing device 216 also limits the key plate 234 from rotating in an opposite direction, to a certain distance limitation about the key plate hinge 240. This distance may be the distance a user of the spring-back force adjustable pointing device 216 may press the key plate 234 for the spring-back force adjustable pointing device 216 to receive an indication of a "click" of the key plate 234. As described herein, this "click" is indicative of an actuation of the key plate 234 that received at the pointing device PCB circuitry 238 via the key trigger 236 as a signal. In this embodiment, the signal indicates that the cursor at the video/graphics display device 210 is selecting or otherwise interacting with the graphics or images presented on the video/graphics display device 210. In the context of a gaming application being executed on the information handling system 200, the click may be an interaction of the user during a gaming experience such as firing a gun, interacting with a virtual object, among other actions.

As described herein, the spring-back force adjustable pointing device 216 may include an opposing magnet adjustment device 242. The opposing magnet adjustment device 242 may include any device that includes a first magnet 241 operatively coupled to the underside of the key plate 234. In these embodiments, a second magnet 243 is placed or selectively arranged below the first magnet 241. In these embodiments of the opposing magnet adjustment device 242, the magnetic fields of the first magnet 241 and second magnet 243 face each other such that "like" poles of the magnets repel each other or are in opposition to each other. In common vernacular, opposing fields of the first magnet 241 and second magnet 243 are described as have similar poles facing each other such as the "north poles" of each magnet 241 and 243 facing each other or the "south poles" of the magnets facing each other. It is appreciated that the magnetic fields of the first magnet 241 and second magnet 243 may have differing magnetic field strengths (ampere per meter or A/m). By arranging these magnets in this way, a non-linear exponential force displacement relationship between the two repelling magnets 241 and 243 is realized when the keyplate moves down during an actuation by a user. This non-linear exponential force displacement relationship creates a spring-back force on the key plate 234 without substantially increasing the initial force required to click or trigger the key plate 234 by the user. By way of example and depending on the magnetic field produced by the two magnets 241 and 243, a gap of 1 mm between the first magnet 241 and second magnet 243 may produce a key plate 234 pressing force of 68 grams such that when the key plate 234 is pressed down by a distance of 0.5 mm, a repelling or spring-back force exerted on the key plate 234 may increase to 108 grams. These actuation forces and repelling forces may be based on the individual magnetic fields produced by the first magnet 241 and second magnet 243 and these distances and gram forces are meant as examples only. The present specification contemplates that different actuation forces and repelling forces may be achieved using different types of magnets with different magnetic field strengths.

In an embodiment, the opposing magnet adjustment device 242 may be a sliding knob-type opposing magnet adjustment device 242. In this embodiment, the first magnet 241 may be operatively coupled to the underside (e.g., opposite a surface of the key plate 234 where a user touches) of the key plate 234. A second magnet 243, in this embodiment, may be operatively coupled to a magnet arm. The magnet arm moves the second magnet 243 closer to or further away from the first magnet 241 via actuation by the user of a slid-knob operatively coupled to a lifter. As the slid-knob is moved, the lifter interfaces with an underside surface of the magnet arm. Due to the non-planar surface of the magnet arm, the further the slide knob and lifter are moved the closer the second magnet 243 moves closer to or further away from the first magnet 241. This allows a user to selectively increase (second magnet 243 closer to the first magnet 241) or decrease (second magnet 243 relatively further away from the first magnet 241) the spring-back force applied to the key plate 234. In some embodiments, the underside of the magnet arm may include a series of plateaus that the magnet arm may rest against the lifter so the distance from the second magnet 243 and first magnet 241 remains unchanged during operation of the spring-back force adjustable pointing device 216.

In another embodiment, the opposing magnet adjustment device 242 may be a rotating barrel housing-type opposing magnet adjustment device 242. In this embodiment, the first magnet 241 is operatively coupled to an underside of the key plate 234. Here, a barrel housing may be placed below the first magnet 241 and may include one or more magnets operatively coupled to the rotating barrel. Each of these magnets operatively coupled to the rotating barrel may be different sizes, may be made of different materials, and/or located at different vertical heights within the rotating barrel relative to each other. The rotating barrel may be operatively coupled to a rotating shaft and rotating knob. The rotating shaft may be sufficiently long to extend out of the bottom of the housing of the spring-back force adjustable pointing device 216 and terminate at the rotating knob. In this embodiment, the user may selectively change which magnet among the one or more magnets operatively coupled to the rotating barrel interacts with the first magnet 241. The user may do this by selectively turning the knob and, thereby, rotating the barrel in order to align a specific magnet operatively coupled to the rotating barrel with the first magnet 241 that is operatively coupled to the underside of the key plate 234. In this manner, the user may either increase or decrease the spring-back force applied to the key plate 234 based on which of the magnets 243 is interacting with the first magnet 241.

Figure 3A:
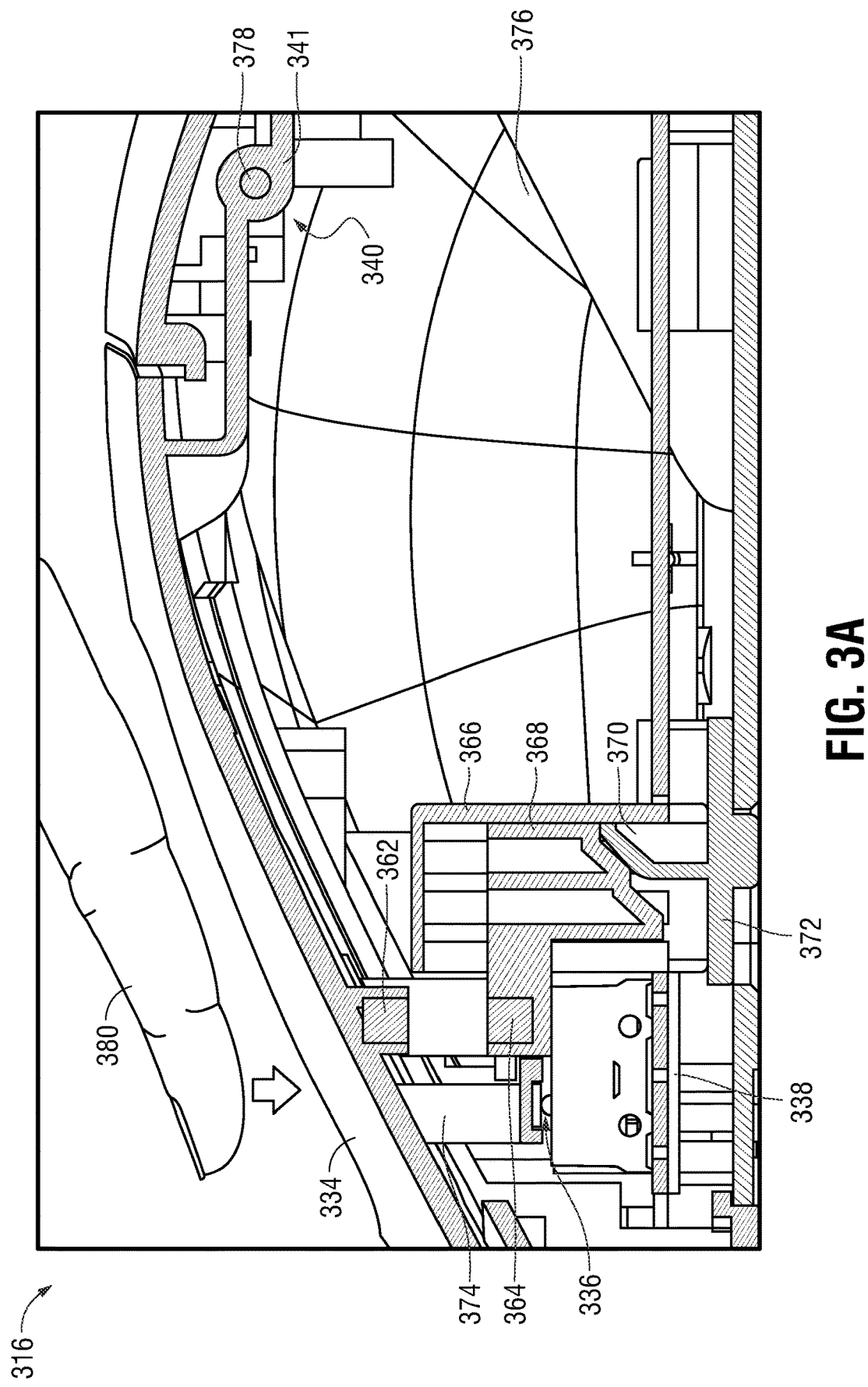
FIG. 3A is a side, partial cut-away view of a slidable opposing magnet adjustment device of a spring-back force adjustable pointing device according to an embodiment of the present disclosure.
Figure 3C:
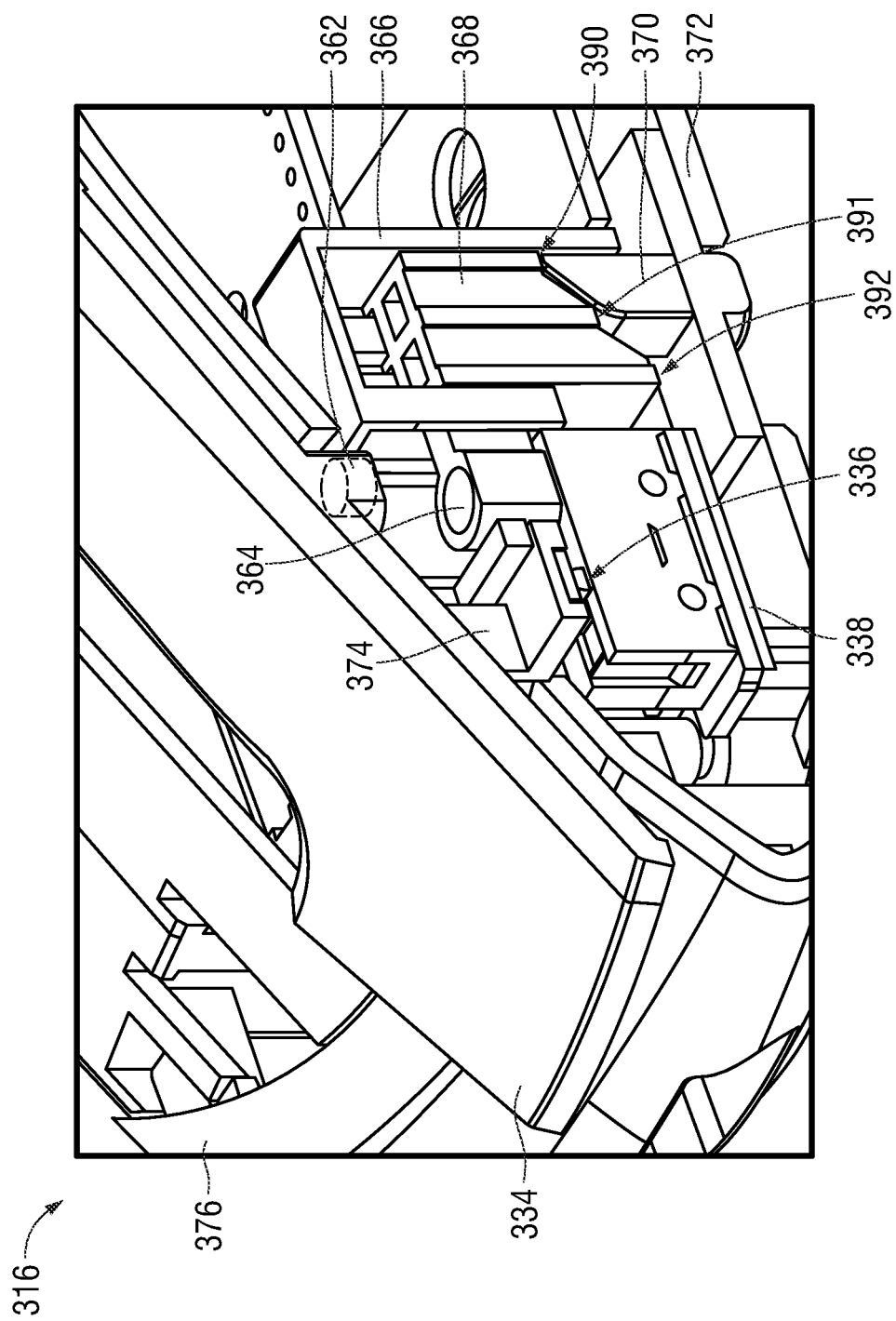
FIG. 3C is a perspective, cut-away view of a slidable opposing magnet adjustment device of a spring-back force adjustable pointing device according to an embodiment of the present disclosure.

Turning now to FIGS. 3A-3D, various internal or cut-away views of a spring-back force adjustable pointing device 316 showing a sliding knob-type opposing magnet adjustment device are presented. In FIG. 3A, a side, partial cut-away view of a slidable opposing magnet adjustment device of a spring-back force adjustable pointing device is shown according to an embodiment of the present disclosure. FIG. 3B is a side, partial cut-away view of a slidable opposing magnet adjustment device of a spring-back force adjustable pointing device according to another embodiment of the present disclosure. FIG. 3C is a perspective, cut-away view of a slidable opposing magnet adjustment device of a spring-back force adjustable pointing device according to an embodiment of the present disclosure. FIG. 3D is a perspective, cut-away view of a slidable opposing magnet adjustment device of a spring-back force adjustable pointing device according to another embodiment of the present disclosure. Each of these figures will now be referred to in describing a sliding knob-type opposing magnet adjustment device of the spring-back force adjustable pointing device 316.

At FIG. 3A the spring-back force adjustable pointing device 316 is shown to include a pointing device housing 376. The pointing device housing 376 may generally house the components of the spring-back force adjustable pointing device 316 described herein. In an embodiment, the pointing device housing 376 is formed out of a plastic, a metal, or any other type of resilient material onto which a user may rest a hand on. In this embodiment, the pointing device housing 376 may be operatively coupled to one or more key plates 334. In a specific embodiment, a key plate 334 may be operatively coupled to the pointing device housing 376 at a key plate hinge 340. In this embodiment, the key plate hinge 340 may be formed by a pin shaft 378 on the housing of the spring-back force adjustable pointing device 316 and a key plate barrel 341 formed on the key plate 334 or a connecting arm extending from the key plate 334 into housing 376. In this embodiment, the pin shaft 378 may be placed within a hole formed in the key plate barrel 341 so that the key plate 334, at the key plate hinge 340, may be allowed to rotate about the key plate hinge 340. In an embodiment, the key plate 334 may also include a key plate stop (not shown) that prevents the key plate 334 from moving away (e.g., up in FIGS. 3A and 3B) from the pointing device housing 376 of the spring-back force adjustable pointing device 316 after a certain upward rotation distance limit is reached. In this embodiment, the key plate hinge 340 and housing 376 of the spring-back force adjustable pointing device 316 also prevents the key plate 334 from rotating in an opposite direction (e.g., down in FIGS. 3A and 3B) thereby limiting, to a certain distance, the rotation of the key plate 334 about the key plate hinge 340.

In an embodiment, the key plate 334 may include a trigger arm 374. The trigger arm 374 may be operatively coupled to the underside of the key plate 334 and extend downwards towards a key trigger 336. The key trigger 336 may be any trigger or switch that is actuated by a physical force applied to the key plate 334 and translated through the trigger arm 374 and to an arm or trigger point on the key trigger 336 in various embodiments. This contact causes the key trigger 336 to send a signal to the pointing device PCB circuitry 338 and that is felt as a "click" indicating actuation of the signal to a user's finger 380. As described herein, a pointing device controller formed on the pointing device PCB circuitry 338 may receive this signal from the key trigger 336 and transmit, either via a wired connection or a wireless connection, to the information handling system (e.g., FIG. 1, 100 and FIG. 2, 200). In this manner, the physical translation of the key plate 334 by the user's finger 380 downwards is recorded by the key trigger 336 and a haptic "click" is felt at the spring-back force adjustable pointing device 316 on the key plate 334. As described herein, as the frequency of the click rate the user's finger 380 engages in to actuate the key plate 334, key plate 334 actuation may not keep up with the speed of the movement of the user's finger 380. This is because of the spring-back force, or lack thereof, of the key plate 334 to return to an up position or un-actuated position. This results in missing or skipped intended actuations. The present embodiments of the spring-back force adjustable pointing device 316 allows for an increase in spring-back force and speed of the key plate 334 response back to an up or unactuated position such that all or more of the actuations from the user's 380 finger may be detected during high frequency actuations.

Thus, along with the key plate hinge 340 allowing the key plate 334 to rotate about the pin shaft 378 freely, the spring-back force adjustable pointing device 316 also includes a first magnet 362 and a second magnet 364 that are arranged in opposing orientations such that they repel each other. In this embodiment, the first magnet 362 may be operatively coupled to an underside of the key plate 334. In the embodiment shown in FIGS. 3A-3D, the first magnet 362 is placed and fixed within a cup-type feature formed on the underside of the key plate 334.

The second magnet 364 may be operatively coupled to a magnet arm 368 with the magnet arm 368 arranging the second magnet 364 directly below the first magnet 362 and affixed to magnet arm 368 in some embodiments. Again, in the embodiment shown in FIGS. 3A-3D, the second magnet 364 is placed and fixed within a reciprocal cup-type feature formed in the magnet arm 368 in an embodiment. The magnet arm 368 is allowed to move up or down within a magnet arm housing 366 secured to the pointing device housing 376 of the spring-back force adjustable pointing device 316. The magnet arm housing 366 prevents the magnet arm 368 from moving laterally within the pointing device housing 376 thereby restricting the movement of the magnet arm 368 to vertical movement.

In this embodiment, the underside of the magnet arm 368 interfaces with a lifter 370. The lifter 370 may include a sloped face that interacts with a sloped face of the underside of the magnet arm 368. The lifter 370 may extend from the underside of the magnet arm 368 to a slide knob 372. In the embodiment shown in FIGS. 3A-3D, the slide knob 372 may be partially within the pointing device housing 376 and partially outside of the pointing device housing 376 and may be operatively coupled to the lifter 370. In an embodiment, the lifter 370 and slide knob 372 may be formed out of a single monolithic piece. In the shown embodiment, the slide knob 372 may be accessible from the bottom of the spring-back force adjustable pointing device 316, but a side or top mounted slide knob 372 is contemplated in various embodiments.

Referring now specifically to FIG. 3B, the interface between the lifter 370 and the underside of the magnet arm 368 is shown. In contrast to FIG. 3A, FIG. 3B shows the lifter 370 interfacing with the magnet arm 368 at a different location. This is due to a user adjusting the placement of the slide knob 372 forward (e.g., to the left of the image in FIG. 3B). As is illustrated in FIG. 3B, movement of the slide knob 372 and, accordingly, the lifter 370 causes the magnet arm 368 to move up. As the magnet arm 368 is moved up, the second magnet 364 is brought closer to the first magnet 362. As described herein, as the first magnet 362 and second magnet 364 are brought closer in proximity to each other, the repelling forces between these two magnets 362, 364 is increased. The arrangement and adjustment of the second magnet 364 relative to the first magnet 362 creates a non-linear exponential force displacement relationship between the first magnet 362 and second magnet 364 in various embodiments. The second magnet 364 is moved closer to the first magnet 362 via actuation of the slide knob 372 by the user, the repelling forces are increased especially at the down or fully actuated position of key plate 334. Therefore, as the second magnet 364 is moved closer to the first magnet 362 a spring-back force against the key plate 334 is increased. This, in turn, causes the key plate 334 to return to a up or un-actuated position relatively quicker after a user has actuated or pushed down the key plate 334. However, because of the non-linear exponential force displacement relationship between the first magnet 362 and second magnet 364, the force required by the user to actuate or push down on the key plate 334 is not increased as much to initially actuate key plate 334 with a downward force. Therefore, the selective arrangement of the second magnet 364 relative to the first magnet 362 allows a user to adjust the spring-back force against the underside of the key plate 334 as the slide knob 372 is moved by the user in order to raise or lower the magnet arm 368 via interaction with the lifter 370.

The underside sloped face of the magnet arm 368 may include a plurality of plateaus 390, 391, and 392. A first plateau 390 is arranged furthest away from the slide knob 372 and causes the magnet arm 368 to be at a lower position by the lifter 370 relative to a second plateau 391 and a third plateau 392 in the sloped face. The third plateau 392 is arranged such that the slide knob 372 is furthest left in the shown embodiment of FIG. 3B and causes the magnet arm 368 to be at a higher position relative to the first plateau 390 or second plateau 391. The second plateau 391 is arranged at an intermediate height relative to the first plateau 390 or the third plateau 392. It is appreciated that the underside of the magnet arm 368 may include more than three plateaus 390, 391, 392 or less than three plateaus 390, 391, 392 or may simply have a sloped face such that a continuous range of positions may be selected in various embodiments. These plateaus 390, 391, 392 may serve as a location where the lifter 370 may rest when interfacing with the underside of the magnet arm 368 in some embodiments. FIG. 3A shows that lifter 370 resting under the first plateau 390 while FIG. 3B shows the lifter 370 resting on the third plateau 392. Due to the varying heights of these plateaus 390, 391, 392, when the lifter 370 is caused to rest under any given plateau 390, 391, 392, a distance between the second magnet 364 and first magnet 362 is set to one of three setting levels.

Turning specifically to FIGS. 3C and 3D, the distance between the second magnet 364 and first magnet 362 (shown in dotted lines) are increased or decreased based on where the user has moved the slide knob 372 and lifter 370. Similar to FIG. 3A, FIG. 3C shows that lifter 370 resting under the first plateau 390. Similar to FIG. 3B, FIG. 3D shows the lifter 370 resting under the third plateau 392. In order to cause the lifter 370 to rest under the first plateau 390, the user may slide the slide knob 372 to a rearmost (e.g., towards the right as shown in FIGS. 3A and 3B) position setting by accessing the slide knob 378 from under the spring-back force adjustable pointing device 316 in one embodiment. Other locations of slide knob 372 or arrangement of lifter 370 shaped face relative to the reciprocal magnet arm 368 shaped face and plateaus 390, 391, 392 are contemplated in embodiments as understood by one of skill in the art. The lifter 370 in the rear-most position of the slide knob 372 and resting under the first plateau 390 as shown in FIG. 3C. This causes the magnet arm 368 to be lowered down and, accordingly, increases the distance the second magnet 364 is relative to the first magnet 362. An increase in the distance between the second magnet 364 and first magnet 362 decreases the influences of the opposing magnetic fields of the first magnet 362 and second magnet 364 on each other such that the spring-back force on the key plate 334 is reduced.

In order to cause the lifter 370 to rest under the third plateau 392 in FIG. 3D, the user may slide the slide knob 372 to a foremost (e.g., towards the left as shown in FIGS. 3A and 3B) position. This causes the magnet arm 368 to be raised up and, accordingly, decreases the distance the second magnet 364 is relative to the first magnet 362. A decrease in the distance between the second magnet 364 and first magnet 362 increases the influences of the opposing magnetic fields of the first magnet 362 and second magnet 364 on each other such that the spring-back force of the key plate 334 is increased.

In order to cause the lifter 370 to rest under the second plateau 391, the user may slide the slide knob 372 to a position intermediate to a foremost and rearmost position as described herein. This causes the magnet arm 368 to be raised to an intermediate position and, accordingly, places the distance the second magnet 364 is relative to the first magnet 362 in a position intermediate to the position of the second magnet 364 when the lifter 370 interfaces the magnet arm 368 at the first plateau 390 and third plateau 392. By placing the second magnet 364 at this distance from the first magnet 362, and intermediate among of influence of the opposing magnetic fields of the first magnet 362 and second magnet 364 on each other imparting an intermediate spring-back force on the key plate 334 relative to when the lifter 370 interfaces the magnet arm 368 at the first plateau 390 or the third plateau 392. In this way, adjusting the position of the slide knob 372 by the user adjusts the position of the lifter 370 thereby raising or lowering the magnet arm 368 at specific intervals. This, in turn, adjusts the influence of the magnetic field of the second magnet 364 and first magnet 362 on each other due to the adjustment of the distances between these two magnets. Again, the non-linear exponential force displacement relationship between two repelling magnets 362, 364 and the reduction or increase in distance between them causes the key plate 334, when it is moved down during an actuation by the user to spring back more quickly to an up or non-actuated position. Adjustments of the slide knob 372, and accordingly, the lifter 370, decreases or increases the spring-back force on the key plate 334, according to various embodiments described herein. This is done without substantially increasing the amount of in trigger force required by the user to push down on the key plate 334.

Although FIGS. 3A through 3D show a sliding knob-type opposing magnet adjustment device 342 that underlies the interaction between opposing magnetic fields of the first magnet 362 and second magnet 364, the present specification contemplates that any number of opposing magnets may be used. By way of example, a pair of magnets may be placed within a pair of cup-type feature or via other attachment formed on the underside of the key plate 334 with one or more magnets formed in the cup-type feature formed in the magnet arm 368. In this example embodiment, these additional pairs of repelling or opposing magnets on the key plate 334 may help to provide balance to the actuation and spring-back of the key plate 334 resulting in a relatively better spring-back response to the user.

The present specification contemplates that the magnets in the described embodiments may be any type of permanent magnet, electropermanent magnet, or electromagnet. In the embodiments where the magnets are permanent magnets, the permanent magnets may be made of iron, nickel and cobalt and their alloys, some alloys of rare-earth metals, and some naturally occurring minerals such as lodestone. In an example embodiment where the opposing magnets are electromagnets, the pointing device PCB circuitry 338 may be used to apply direct current (DC) to a metal forming the magnets in order to produce the electromagnetic field. In this embodiment, the power source used to provide the DC to the metal may originate from a battery formed within the spring-back force adjustable pointing device 316 or from a power source at the information handling system and provided to the pointing device PCB circuitry 338 via an electrical wire interface between the spring-back force adjustable pointing device 316 and the information handling system. In other example embodiments where opposing magnets include at least one electropermanent magnet, the pointing device PCB circuitry 338 may be used to supply direction current to an inductive coil in the electropermanent magnet to turn the magnetic field and an opposite direction to turn off the magnetic field as understood by those in the art.

In an embodiment, the sliding knob-type opposing magnet adjustment device and rotating barrel housing-type opposing magnet adjustment device (e.g., FIGS. 4A-4D) may be implemented together to switch both the type, size, and magnetic flux of a magnet placed below the first magnet 362 that is operatively coupled to the underside of the key plate 334. In this embodiment, the barrel of the rotating barrel housing-type opposing magnet adjustment device embodiment may be moved vertically via the lifter arm 370 of the sliding knob-type opposing magnet adjustment device described in connection with FIGS. 3A-3D. Here, the bottom side of the barrel may be similarly configured to the bottom portion of the magnet arm 368. In an embodiment, the bottom surface of the barrel may include any number of plateaus similar to the first plateau 390, second plateau 391, and third plateau 392 shown in FIGS. 3A-3D. Here, a rotating shaft of the rotating barrel housing-type opposing magnet adjustment device embodiment may be telescopic allowing the length of the rotating shaft to increase or decrease as the barrel is moved up and down. In this embodiment, the rotating knob (e.g., FIG. 4A, 472) may be placed next to the lifter 370 so that the user may slide and lifter 370 and turn the rotating knob in order to both adjust the height of any magnet relative to the first magnet 362 as well as change which of a plurality of magnets interface with the first magnet 362. This hybrid of these embodiments may allow for additional granularity in selecting the magnetic field that is applied to the first magnet 362 that is operatively coupled to the underside of the key plate 334. This increases the customizability of the spring-back force adjustable pointing device 316 for each type of user operating each type of application being executed on the information handling system.

Figure 4A:
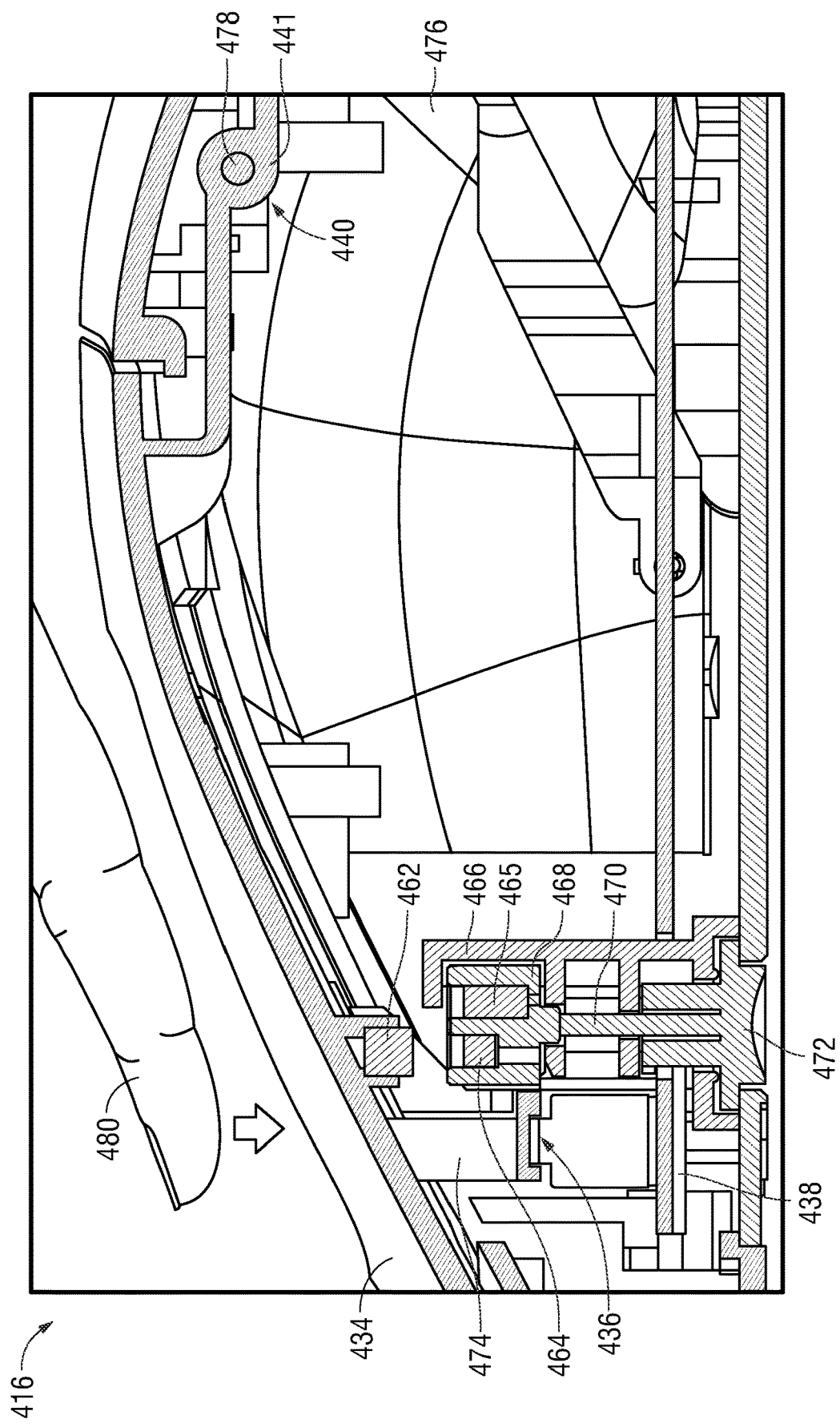
FIG. 4A is a side, partial cut-away view of a rotating barrel housing-type opposing magnet adjustment device of a spring-back force adjustable pointing device according to another embodiment of the present disclosure.
Figure 4B:
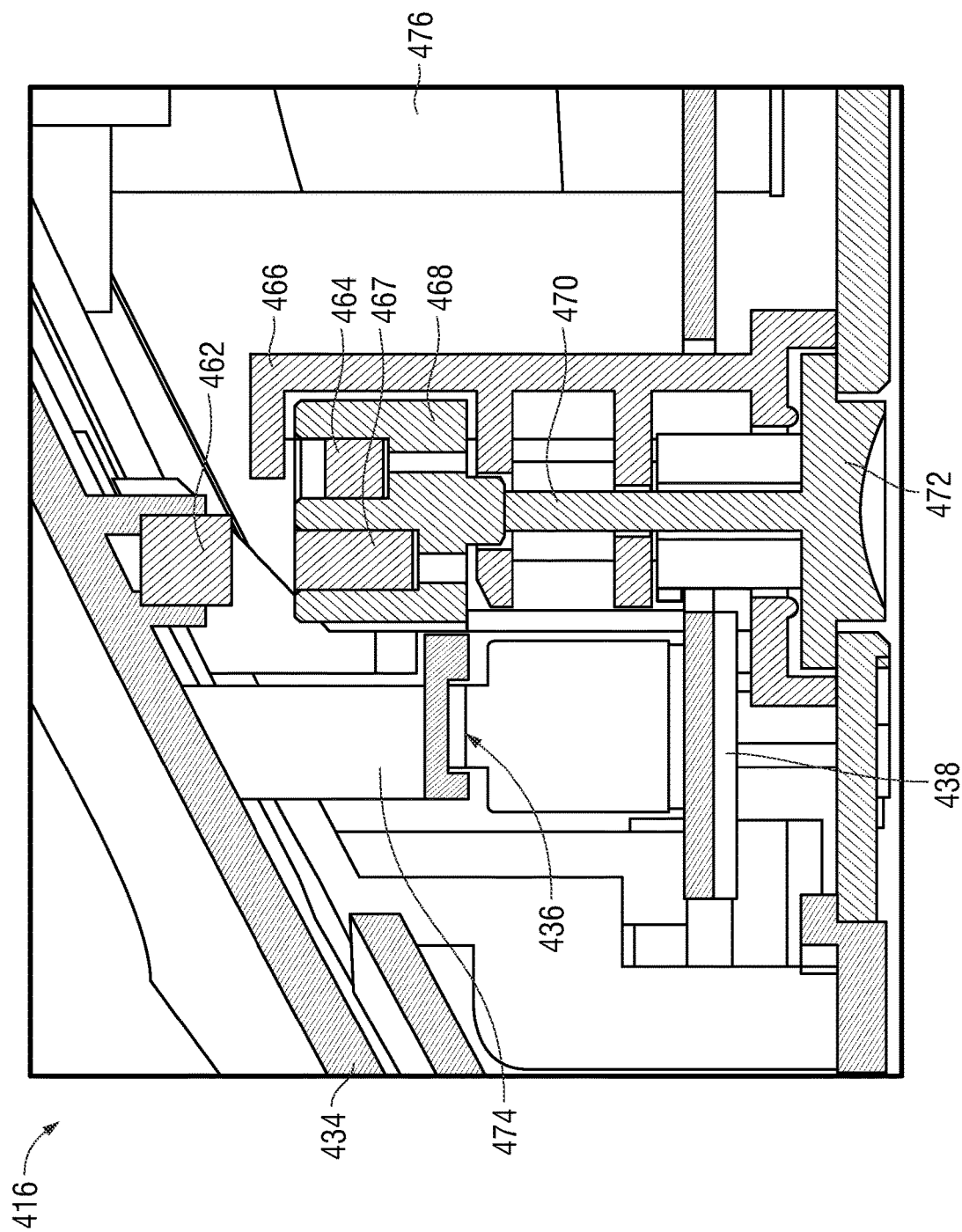
FIG. 4B is a side, partial cut-away view of a rotating barrel housing-type opposing magnet adjustment device of a spring-back force adjustable pointing device according to another embodiment of the present disclosure.
Figure 4D:
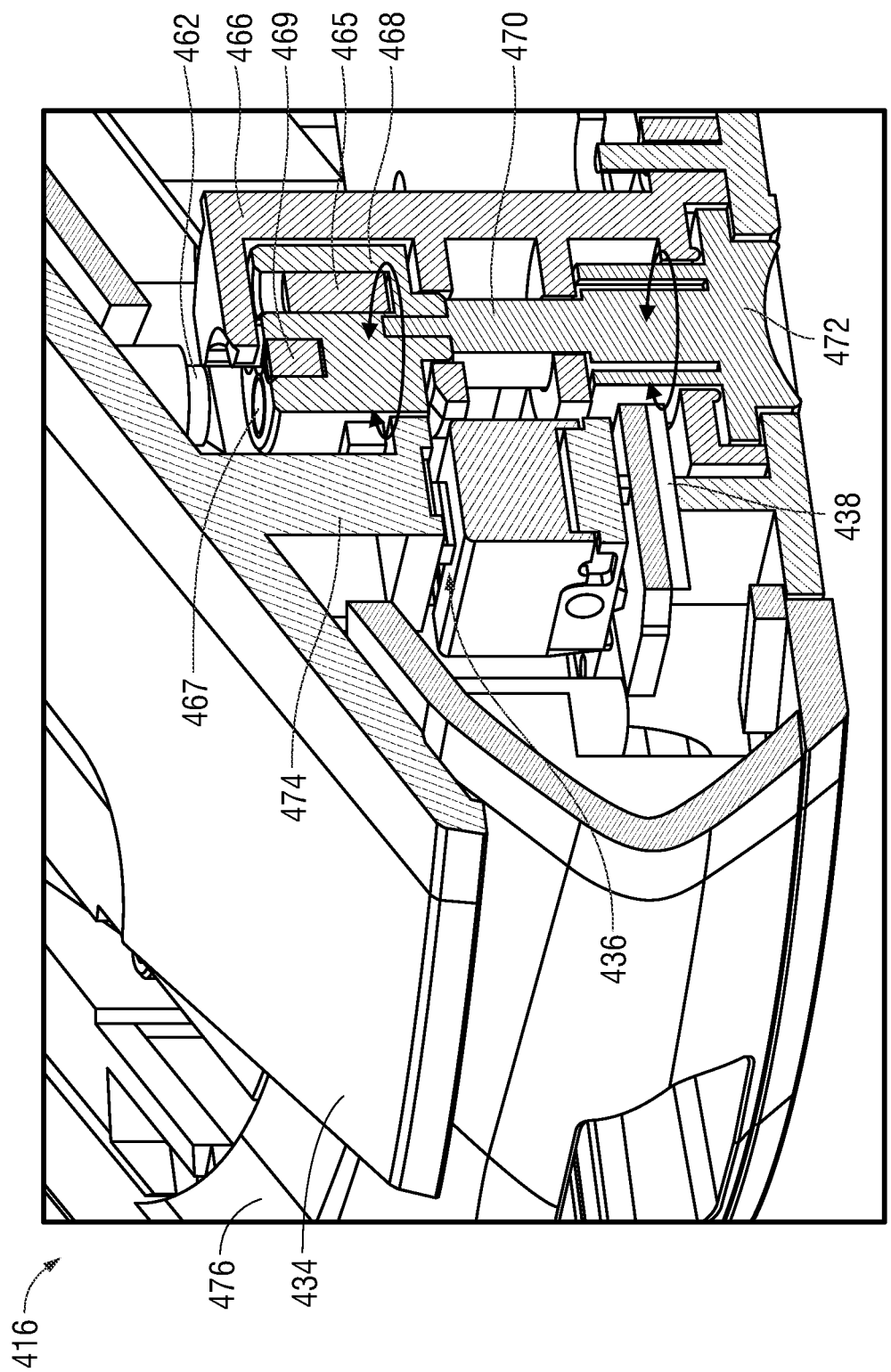
FIG. 4D is a perspective, cut-away view of a rotating barrel housing-type opposing magnet adjustment device of a spring-back force adjustable pointing device according to another embodiment of the present disclosure.

Turing now to FIGS. 4A through 4D various internal or cut-away views of a spring-back force adjustable pointing device 416 showing a rotating barrel housing-type opposing magnet adjustment device 416 are presented. FIG. 4A is a side, partial cut-away view of a rotating barrel housing-type opposing magnet adjustment device of a spring-back force adjustable pointing device 416 according to another embodiment of the present disclosure. FIG. 4B is a side, partial cut-away view of a rotating barrel housing-type opposing magnet adjustment device of a spring-back force adjustable pointing device 416 according to another embodiment of the present disclosure. FIG. 4C is a perspective, cut-away view of a rotating barrel housing-type opposing magnet adjustment device of a spring-back force adjustable pointing device 416 according to an embodiment of the present disclosure. FIG. 4D is a perspective, cut-away view of a rotating barrel housing-type opposing magnet adjustment device of a spring-back force adjustable pointing device 416 according to another embodiment of the present disclosure. Each of these figures will now be referred to in describing a rotating barrel housing-type opposing magnet adjustment device of the spring-back force adjustable pointing device 416.

At FIG. 4A, for example, the spring-back force adjustable pointing device 416 is shown to include a pointing device housing 476. The pointing device housing 476 may generally house the components of the spring-back force adjustable pointing device 416 described herein. In an embodiment, the pointing device housing 476 is formed out of a plastic, a metal, or any other type of resilient material onto which a user may rest a hand on. In this embodiment, the pointing device housing 476 may be operatively coupled to one or more key plates 434. In a specific embodiment, a key plate 434 may be operatively coupled to the pointing device housing 476 at a key plate hinge 440. In this embodiment, the key plate hinge 440 may be formed by a pin shaft 478 on the housing of the spring-back force adjustable pointing device 416 and a key plate barrel 441 formed on the key plate 434. In this embodiment, the pin shaft 478 may be placed within a hole formed in the key plate barrel 441 so that the key plate 434, at the key plate hinge 440, may be allowed to rotate about the key plate hinge 440. In an embodiment, the key plate 434 may also include a key plate stop (not shown) that prevents the key plate 434 from moving away (e.g., up in FIGS. 4A and 4B) from the pointing device housing 476 of the spring-back force adjustable pointing device 416 after a certain distance limit is reached. In this embodiment, the housing of the spring-back force adjustable pointing device 416 also prevents the key plate 434 from rotating in an opposite direction (e.g., down in FIGS. 4A and 4B) thereby limiting, to a certain distance, the rotation of the key plate 434 about the key plate hinge 440. For example, key plate hinge 440 may be anchored by an extension of key plate barrel 441 to some portion of housing 476. Thus, key plate 434, an arm or extension to key plate hinge 440 and barrel extension of key plate barrel 441 create a dive board-type structure that may be deflected downward by a user's finger 480.

In an embodiment, the key plate 434 may include a trigger arm 474. The trigger arm 474 may be operatively coupled to the underside of the key plate 434 and extend downwards towards a key trigger 436. The key trigger 436 may be any trigger or switch that is actuated by a physical force applied to the key plate 434 and translated through the trigger arm 474 and to an arm or trigger point on the key trigger 436. This contact causes the key trigger 436 to send a signal to the pointing device PCB circuitry 438 that is recorded as a "click" or actuation signal by user 480. As described herein, a pointing device controller formed on the pointing device PCB circuitry 438 may receive this signal from the key trigger 436 and transmit, either via a wired connection or a wireless connection, to the information handling system (e.g., FIG. 1, 100 and FIG. 2, 200). In this manner, the physical translation of the key plate 434 by the user 480 downwards is recorded as an actuation or a "click" at the spring-back force adjustable pointing device 416. A haptic click response may be provided back to the user 480. As described herein, as the frequency of the click rate the user 480 engages in to actuate the key plate 434, the click detection or key plate 434 actuation detection may not keep up with the speed of the movement of the user's 480 finger. This is because of the spring-back force, or lack thereof, of the key plate 434. This results in missing or skipped intended actuations. The present embodiments of the spring-back force adjustable pointing device 416 allows for an increase in spring-back force and speed of the key plate such that all or more of the actuations from the user's 480 finger may be detected.

Thus, along with the key plate hinge 440 allowing the key plate 434 to rotate about the pin shaft 478 freely except as limited within housing 476, the spring-back force adjustable pointing device 416 also includes a first magnet 462 and one of plurality of opposing magnets 464, 465, 467, 469 that may be arranged in opposing orientations by a barrel structure discussed herein such that they repel each other. In this embodiment, the first magnet 462 may be operatively coupled to an underside of the key plate 434. In the embodiment shown in FIGS. 4A-4D, the first magnet 462 is placed and fixed within a cup-type feature formed on the underside of the key plate 434.

The plurality of opposing magnets 464, 465, 467, 469 may each be placed within a cup-type feature formed in a rotating barrel 468. As depicted in FIGS. 4A through 4D, these cup-type features housing the plurality of opposing magnets 464, 465, 467, 469 are arranged in a circular or other arrangement about a rotating axis of the rotating barrel 468. In an embodiment, these opposing magnets 464, 465, 467, 469 may be arranged within these cup-type features so that as the rotating barrel 468 is rotated, an opposing magnet 464, 465, 467, 469 may be selected and aligned below the first magnet 462. In an embodiment, each of the opposing magnets 464, 465, 467, 469 may be placed at different vertical locations within the rotating barrel 468 so that the opposing magnetic fields between the first magnet 462 and any one of the opposing magnets 464, 465, 467, 469 may interact to different degrees. The vertical locations of each of the opposing magnets 464, 465, 467, 469 may be measured from a top or upper surface of the rotating barrel 468 to the top or upper surface of each opposing magnet 464, 465, 467, 469. In another embodiment, the opposing magnets 464, 465, 467, 469 may also each produce their own respective magnetic fields that differ in various magnetic strengths among each other. In this embodiment, the size of each opposing magnet 464, 465, 467, 469 or the type of material the opposing magnets 464, 465, 467, 469 are made of are some factors that determine the magnetic field magnitude of these opposing magnets 464, 465, 467, 469.

The rotating barrel 468 may be operatively coupled to a rotating knob 472 via a shaft 470. The rotating knob 472 may be formed partially outside of the pointing device housing 476 (e.g., exposed outside the pointing device housing 476 through a via) and partially within the pointing device housing 476. In an embodiment, the rotating knob 472 and shaft 470 for a single monolithic piece and may be operatively coupled to the rotating barrel 468 so that rotation of the rotating knob 472 translates into rotation of the rotating barrel 468. The rotation of the rotating knob 472, shaft 470 and rotating barrel 468 may be assisted via the inclusion of a barrel housing 466 that aligns the rotating barrel 468 with the rotating knob 472 and shaft 470 as well as maintains a rotational axis of the rotating barrel 468 and shaft 470 and rotating knob 472 in generally a vertical orientation under the first magnet 462 and key plate 434.

During operation of the spring-back force adjustable pointing device 416 described in FIGS. 4A through 4D, a user may click or actuate the key plate 434 in order to create a click action and send a signal to the information handling system as described herein. However, where the rate of clicking by the user increases, the user may rotate the rotating knob 472 in order to adjust which magnetic field associated with any one of the opposing magnets 464, 465, 467, 469 that interacts with the magnetic field of the first magnet 462. In this embodiment, the magnetic field of the first magnet 462 remains constant. However, because the magnetic fields of each of the opposing magnets 464, 465, 467, 469 may vary depending on their heights, the materials they are made of or the size of the opposing magnets 464, 465, 467, 469, the repelling force between the first magnet 462 and any one of the opposing magnets 464, 465, 467, 469 may be increased or decreased depending on which opposing magnet 464, 465, 467, 469 is oriented below the first magnet 462. The rotating knob 472 may provide indications to the user as to how the repulsion of the first magnet 462 from any one of the opposing magnets 464, 465, 467, 469 formed in the rotating barrel 468 is increased or decreased with the knob rotation to particular positions. The embodiment of FIG. 4A shows a second magnet 464 and a fifth magnet 465 formed within the rotating barrel 468. Because FIG. 4A is a cut-away view of the rotating barrel 468, a third magnet 467 and a fourth magnet 469 are not shown. However, turning to FIG. 4B, the rotating barrel 468 has been rotated via actuation by the user of the rotating knob 472. In doing so, the user has aligned the third magnet 467 directly under the first magnet 462 and the second magnet 464 has been realigned from under the first magnet 462.

In FIG. 4C, the third magnet 469 is not aligned under the first magnet 462 and the second magnet 464 has taken its place again via opposite rotation of the rotating barrel 468 (e.g., as compared to a rotational direction of the rotating barrel 468 as shown and described in reference to a rotational direction between FIGS. 4A and 4B) and put vertically in line with the first magnet 462 again. It is noted that the cut-out view plane of the rotating barrel 468 as shown in FIG. 4C intersects the third magnet 467 and fourth magnet 469 to show half of each of these magnets. In FIG. 4C, the second magnet 464 (in dashed lines) and fifth magnet (e.g., fifth magnet 465 in FIG. 4A) are embedded into the rotating barrel 468 and are not shown. FIG. 4D further shows a subsequent rotation of the rotating barrel 468 via actuation of the rotating knob 472 in order to align the third magnet 467 under the first magnet 462. Unlike FIGS. 4A and 4B, FIG. 4C shows a perspective view of the rotating barrel 468 giving a position view of the second magnet 464, the third magnet 467, and fourth magnet 469 relative to each other with a view of the fifth magnet 465 being obstructed by a portion of the barrel housing 466. FIG. 4D shows a perspective view of the rotating barrel 468 giving a position view of the third magnet 467, fourth magnet 469, and fifth magnet 465 relative to each other with a view of the second magnet 464 being obstructed by a portion of the barrel housing 466. FIGS. 4C and 4D also show rotation arrows indicating the directional rotations available to the user to rotate the rotating barrel 468. In order to rotate the rotating knob 472, a user may pick up the spring-back force adjustable pointing device 416 and rotate the rotating knob 472 from the bottom of spring-back force adjustable pointing device 416 either clockwise or counter-clockwise in various embodiments as described herein. Once adjusted, the user may set the spring-back force adjustable pointing device 416 back on a surface such as a desk and continue with using the spring-back force adjustable pointing device 416 in order to provide input to an information handling system.

Although FIGS. 4A through 4D show four magnets housed within the cup-type housings in the rotating barrel 468, it is appreciated that the rotating barrel 468 may house more or less than four magnets. Where more magnets are housed within the rotating barrel, the refinement of changes to the spring-back force of the key plate may be realized. In this embodiment, the circumference of the rotating barrel 468 may be increased to accommodate these additional magnets.

The present specification contemplates that the magnets in the described embodiments of the rotating barrel housing-type opposing magnet adjustment device 416 may be any type of permanent magnet, electropermanent magnet, or electromagnet. In the embodiments where the magnets are permanent magnets, the permanent magnets may be made of iron, nickel and cobalt and their alloys, some alloys of rare-earth metals, and some naturally occurring minerals such as lodestone. In the embodiments where the opposing magnets are electromagnets, the pointing device PCB circuitry 438 may be used to apply direct current (DC) to a metal forming the magnets in order to produce the electromagnetic field. In this embodiment, the power source used to provide the DC to the metal may originate from a battery formed within the spring-back force adjustable pointing device 416 or from a power source at the information handling system and provided to the pointing device PCB circuitry 438 via an electrical wire interface between the spring-back force adjustable pointing device 416 and the information handling system. As described herein, where one or more of the opposing magnets 464, 465, 467, 469 is an electropermanent magnet, the pointing device PCB circuitry 438 may be used to apply a current pulse to a wire winding around part of the metal forming the magnet in order to alter the electromagnetic field of a low coercivity magnet relative to a high coercivity magnet. In this embodiment, the electropermanent magnet includes two sections: a first section that is a relatively high coercivity magnetic material and the other that includes a relatively low coercivity magnetic material. When the current pulse is applied to the wire winding around one of these magnetic materials, the direction of magnetization (e.g., the polarity of the magnetic field) may be switched relative to the other magnetic material. In an embodiment, the application of the current pulse produces a net external magnetic field across its poles such that the polarity may be turned on or off to align or make the magnetic fields opposite thus turning on or off the electropermanent magnetic field. In this embodiment, the battery may be used to apply this current pulse so that the battery does not apply a constant current to the magnets like in the electromagnetic embodiment described herein.

As described herein, the sliding knob-type opposing magnet adjustment device (e.g., shown in FIGS. 3A-3D) and rotating barrel housing-type opposing magnet adjustment device shown in FIGS. 4A-4D may be implemented together to switch both the type, size, and magnetic flux of a magnet placed below the first magnet 462 that is operatively coupled to the underside of the key plate 434 in an embodiment. In this embodiment, the rotating barrel 468 of the rotating barrel housing-type opposing magnet adjustment device embodiment may be moved vertically via the lifter arm (e.g., 370 of FIGS. 3A-3D) of the sliding knob-type opposing magnet adjustment device described in connection with FIGS. 3A-3D. Here, the bottom side of the rotating barrel 468 may be similarly configured to the bottom portion of the magnet arm (e.g., 368 of FIGS. 3A-3D). In an embodiment, the bottom surface of the rotating barrel 468 may include any number of plateaus similar to the first plateau 390, second plateau 391, and third plateau 392 shown in FIGS. 3A-3D. Here, the shaft 470 of the rotating barrel housing-type opposing magnet adjustment device embodiment may be telescopic allowing the length of the shaft 470 to increase or decrease as the rotating barrel 468 is moved up and down via movement of the lifter 370 shown in FIGS. 3A-3D. In this embodiment, the rotating knob 472 may be placed next to the lifter 370 so that the user may slide and lifter 370 and turn the rotating knob 472 in order to both adjust the height of any magnet relative to the first magnet 462 as well as change which of a plurality of magnets interface with the first magnet 462 as described herein. This hybrid of these embodiments may allow for additional granularity in selecting the magnetic field that is applied to the first magnet 462 that is operatively coupled to the underside of the key plate 434. This increases the customizability of the spring-back force adjustable pointing device 416 for each type of user operating each type of application being executed on the information handling system.

Figure 5:
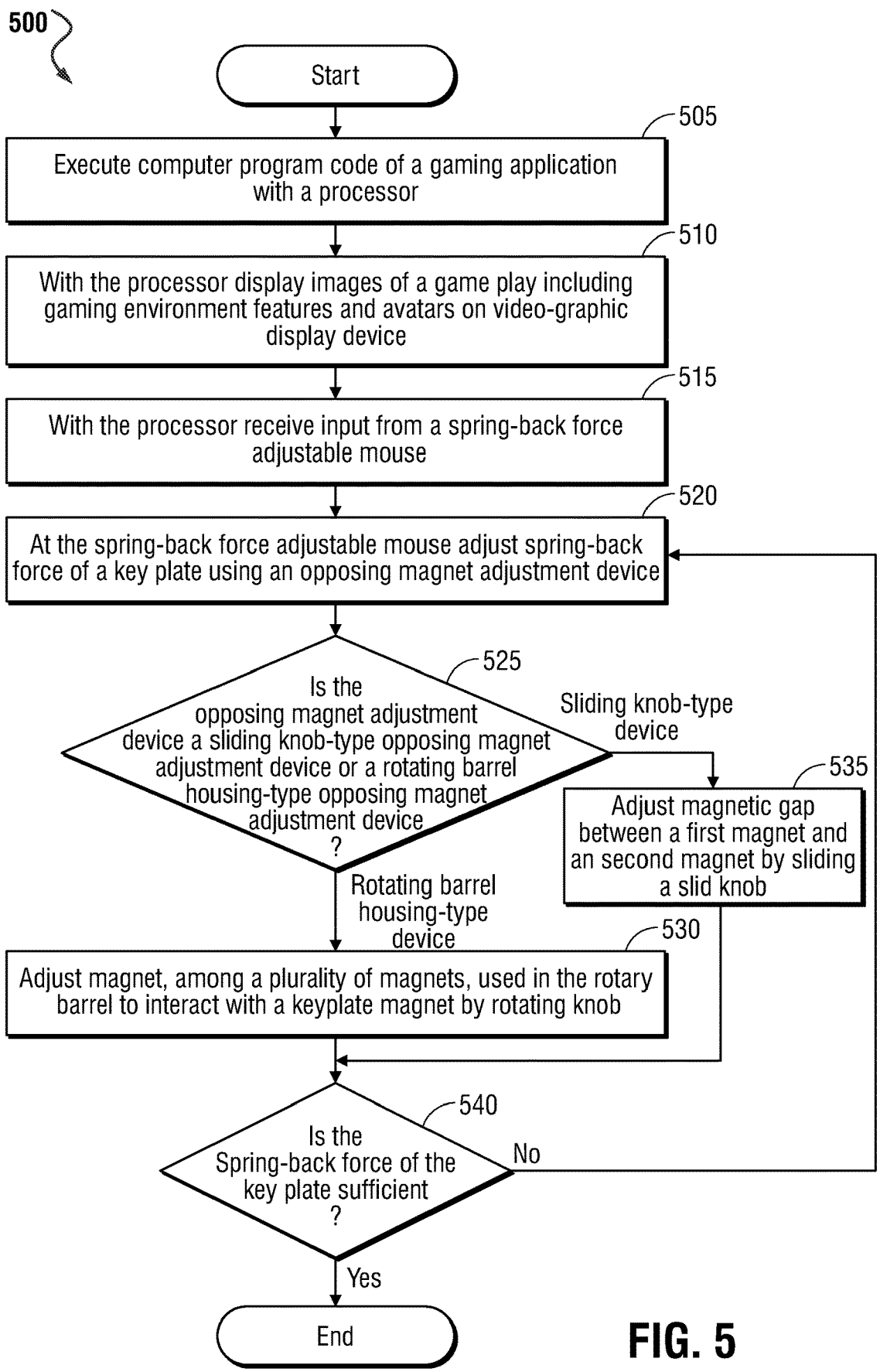
FIG. 5 is a flow diagram illustrating a method of adjusting the spring-back force of a key plate on a spring-back force adjustable pointing device according to an embodiment of the present disclosure.

FIG. 5 is a flow diagram illustrating a method 500 of adjusting the spring-back force of a key plate on a spring-back force adjustable pointing device according to an embodiment of the present disclosure. As described herein, the adjustment of the spring-back force of the spring-back force adjustable pointing device is accomplished by changing a distance between a first and second magnet or adjusting which magnet, among a plurality of magnets to be aligned with the first magnet as described herein. By making these adjustments, the presently-described embodiments may take advantage of the non-linear exponential force displacement relationship between two repelling magnets and the reduction of the distance between them when the key plate is moved down during actuation of the key plate by the user. In these embodiments, the spring-back force of the key plate is significantly increased without substantially increasing the initial amount of force required to actuation the key plate by the user. This further allows a user to selectively increase and decrease the frequency of actuation of the key plate based on the intended use of the spring-back force adjustable pointing device. For example, the user may engage in a gaming application where the key plate is used to, for example, fire a virtual gun during gameplay. However, such spring-back may not be necessary or desired in other software applications. In this embodiment, the user may increase the spring-back force via the methods 500 described herein in order for the key trigger of the spring-back force adjustable pointing device to receive the relatively higher frequency clicks at the key plate by the user. Similarly, where such a frequency of clicks is not necessary such as when the user is browsing the web using a web browsing application, the user may reduce the spring-back force due to the relatively anticipated lower frequency of clicks at the key plate as desired.

The method 500 may begin at block 505 with a processor executing a computer program code of a gaming application. Although the present embodiment describes the use of the spring-back force adjustable pointing device in the context of executing a gaming application, the present specification contemplates that any other executable code defining any other application may be executed and the operation of the spring-back force adjustable pointing device may be equally applied. In this example of a gaming application, however, it is anticipated that a user may actuate a key plate of the spring-back force adjustable pointing device relatively more frequently than during the execution of, for example, a browsing application.

The method 500 may continue with the processor displaying images of a game play including a gaming environment features and avatars, for example, on a video/graphics display device at block 510. These images presented to the user may include images that allow a user to direct the action of the avatar as the avatar is made to move about the gaming environment by using, in these examples, the spring-back force adjustable pointing device. Other input devices may also be used by the user in order to allow the user to engage in the game play such as a joystick, a keyboard, and the like. Where the game play includes weapons such as guns that are being implemented by the avatar, for example, the actuation of the key plate of the spring-back force adjustable pointing device may cause these weapons to fire such that a single actuation of the key plate causes the weapon to be fired once. Where the user wishes to fire the weapon frequently, the user may actuate the key plate relatively more frequently. Unlike previous pointing devices, the spring-back force adjustable pointing device described herein may register all actuations of the key plate by the user regardless of the frequency.

At block 515, the method 500 may continue with receiving the input from the spring-back force adjustable pointing device by the processor of the information handling system. As described herein, the actuation of the key plate causes a switch or key trigger to be actuated and a signal to be received at a pointing device PCB circuitry. The pointing device PCB circuitry may, in some embodiments, convert this signal received from the key trigger into a signal that may be interpreted as an actuation by the processor of the information handling system when received. At this point the signal may be relayed to the processor. The method of relaying this signal may be accomplished, in an embodiment, by transmitting the signal over a data line operatively coupling the spring-back force adjustable pointing device to the information handling system at, for example, a USB port. In an alternative embodiment, the pointing device PCB circuitry may include a transmitter that sends these signals to the information handling system wirelessly.

The method 500 may continue at block 520 with adjusting a spring-back force of a key plate using an opposing magnet adjustment device at the spring-back force adjustable pointing device. The adjustment of the spring-back force may depend on whether the spring-back force adjustable pointing device includes a sliding knob-type opposing magnet adjustment device or a rotating barrel housing-type opposing magnet adjustment device as they are described herein. Therefore, the method 500 includes determining whether the opposing magnet adjustment device is a sliding knob-type opposing magnet adjustment device or a rotating barrel housing-type opposing magnet adjustment device. The actuation methods to be used by the user are different in that with a sliding knob-type opposing magnet adjustment device the user may slide a knob in order to adjust the spring-back force of the key plate while, with a rotating barrel housing-type opposing magnet adjustment device, the user may rotate a rotating knob in order to accomplish this task.

Where the opposing magnet adjustment device is a sliding knob-type opposing magnet adjustment device, the method 500 may continue at block 535 with adjusting the magnetic gap or the distance between the first magnet and second magnet by sliding a knob. As described in connection with FIGS. 3A through 3D, as the sliding knob is moved, a lifter is caused to interface with a magnet arm housing the second magnet. In this embodiment, a lateral movement (e.g., forwards, or backwards) of the sliding knob translates into a vertical movement (e.g., up, or down) of the magnet arm causing the second magnet to be driven closer to the first magnet or further away from the first magnet. A decrease in the distance between the second magnet and first magnet increases the influences of the magnetic fields of the first magnet and second magnet on each other such that the spring-back force of the key plate is increased. An increase in the distance between the second magnet and the first magnet decreases the influences of the magnetic fields these magnets have on each other and the spring-back force of the key plate is decreased. In this manner the user may select a spring-back force that suits the user's intended use of the rotating barrel housing-type opposing magnet adjustment device.

At this point, the method 500 may continue to block 540 to determine whether the spring-back force of the key plate is sufficient. Where the spring-back force is sufficient, the method 500 may end here and the user may engage in the actions of game play. Where the spring-back force is not sufficient, the method 500 may return to block 520 as described herein.

Where it is determined at block 525 that the opposing magnet adjustment device is a rotating barrel housing-type opposing magnet adjustment device, the method 500 may continue at block 530 with adjusting which magnet, among a plurality of magnets formed into a rotating barrel is set to interact with the first magnet operatively coupled to the underside of the key plate. As descried in connection with FIGS. 4A through 4D, as a rotating knob is rotated by a user, the type of magnet that is caused to interface vertically with the first magnet may be selectively changed. Because the rotating barrel houses any number of magnets, each of which have varying magnetic field strengths relative to the first magnet, the repulsion force exerted by each of these magnets housed within the rotating barrel on the first magnet may also vary accordingly. The rotating knob may visually indicate to the user these relative magnetic field strengths and the user may increase or decrease the spring-back force on the first magnet and, accordingly, the key plate as desired.

Again, when the changes have been made to the spring-back force with the user rotating the rotating knob at block 530, the user may again determine if the spring-back force is sufficient at block 540. Where it is sufficient, the method 500 may end. Where it is not sufficient, the method 500 may return to block 520 to engage in those processes described herein.

The blocks of the flow diagrams of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system, comprising:
a processor;
a data storage device;
a power management unit (PMU);
a spring-back force adjustable pointing device operatively coupled to communicate with the processor to control a cursor, including:
a pointing device housing;
a key plate operatively coupled in the pointing device housing at a key plate hinge to receive a press from a user's finger;
a first magnet operatively coupled to the key plate; and
a second magnet operatively coupled to an opposing magnet adjustment device selected from a magnetic arm housing the second magnet operatively coupled to a slide knob to interface with a lifter to lift the second magnet relative to the first magnet or a rotation knob to rotate the barrel housing the second magnet to adjust the position of the second magnet relative to the first magnet, wherein the first magnet and second magnet have repelling poles facing each other to assist spring-back of the key plate when opposing magnets fields interact and the slide knob and the lifter or the barrel make an adjustment to second magnet location and the force required from a press from a user's finger and speed of spring-back of the key plate.

2. The information handling system of claim 1 further comprising:
the opposing magnet adjustment device including the magnet arm to house the second magnet; and
the slide knob to interface with the lifter operatively coupled to the slide knob and the magnet arm to selectively adjust the distance of the second magnet from the first magnet.

3. The information handling system of claim 1 further comprising:
the opposing magnet adjustment device having the barrel housing to house the second magnet and one or more additional magnets, the second magnet and one or more additional magnets having different magnetic field strengths; and
the rotation knob to rotate the barrel housing to operatively change the position of the second magnet relative to the first magnet to operatively engage the magnetic fields of the one or more additional magnets with the magnetic field of the first magnet and operatively disengage the magnetic field of the second magnet from the magnetic field of the first magnet.

4. The information handling system of claim 1 further comprising:
the key plate hinge operatively coupled to a pin shaft formed into the pointing device housing; and
a key plate barrel formed into the key plate, wherein the key plate barrel is placed on the pin shaft to create the key plate hinge and allow the key plate to rotate about the pin shaft.

5. The information handling system of claim 1 further comprising:
a key plate trigger arm operatively coupled to the key plate to actuate a switch when the key plate is pressed down by a user.

6. The information handling system of claim 1 further comprising:
a pointing device printed circuit board (PCB) include pointing device PCB circuitry that sends and receives data and power from the processor and PMU, respectively, via a data and power line operatively coupled to the information handling system.

7. The information handling system of claim 1 further comprising:
the spring-back force adjustable pointing device having a battery;
the spring-back force adjustable pointing device having a network interface device operatively coupled to the battery to wirelessly couple the spring-back force adjustable pointing device to the information handling system.

8. A spring-back force adjustable pointing device, comprising:
a pointing device housing;
a key plate operatively coupled to the pointing device housing at a key plate hinge;
a first magnet operatively coupled to the key plate; and
a second magnet operatively coupled to an opposing magnet adjustment device to adjust the position of the second magnet relative to the first magnet, wherein the first magnet and second magnet have repelling poles facing each other and to assist spring-back of the keyplate when opposing magnetic fields interact;
the opposing magnet adjustment device comprising:
a magnet arm to house the second magnet; and
a slide knob to interface a lifter operatively coupled to the slide knob with the magnet arm to selectively adjust the distance between the second magnet and the first magnet to adjust the magnetic field levels during actuation of the key plate.

9. The spring-back force adjustable pointing device of claim 8 further comprising:
a magnet arm housing to slidably engage with the magnet arm to allow the magnet arm to move up or down when the slide knob is moved and the lifter interfaces with the magnet arm.

10. The spring-back force adjustable pointing device of claim 8 further comprising:
the key plate hinge operatively coupled to a pin shaft formed into the pointing device housing; and
a key plate barrel formed into the key plate, wherein the key plate barrel is placed on the pin shaft to create the key plate hinge and allow the key plate to rotate about the pin shaft.

11. The spring-back force adjustable pointing device of claim 8 further comprising:
a key plate trigger arm operatively coupled to the key plate to actuate a switch when the key plate is pressed down by a user.

12. The spring-back force adjustable pointing device of claim 8 further comprising:
a pointing device printed circuit board (PCB) include pointing device PCB circuitry that sends and receives data and power from an information handling system processor and power management unit (PMU), respectively, via a data and power line operatively coupled to the information handling system.

13. The spring-back force adjustable pointing device of claim 8 further comprising:
a battery; and
a network interface device operatively coupled to the battery to wirelessly couple the spring-back force adjustable pointing device to the information handling system.

14. The spring-back force adjustable pointing device of claim 8, wherein the slide knob is accessible from outside the pointing device housing for a user to actuate the slide knob to adjust the height of the second magnet relative to the first magnet.

15. A spring-back force adjustable pointing device, comprising:
a pointing device housing;
a key plate operatively coupled to the pointing device housing at a key plate hinge;
a first magnet operatively coupled to the key plate; and
a second magnet operatively coupled to an opposing magnet adjustment device to adjust the position of the second magnet relative to the first magnet, wherein the first magnet and second magnet have repelling poles facing each other to assist spring-back of the keyplate when opposing magnetic fields interact;
the opposing magnet adjustment device further comprising:
a barrel housing to house the second magnet and one or more additional magnets, the second magnet and one or more additional magnets having different magnetic field strengths; and
a rotation knob to rotate the barrel housing to operatively change the position of the second magnet relative to the first magnet to operatively engage the magnetic field of one of the one or more additional magnets with the magnetic field of the first magnet and operatively disengage the magnetic field of the second magnet from the magnetic field of the first magnet.

16. The spring-back force adjustable pointing device of claim 15 further comprising:
the key plate hinge operatively coupled to a pin shaft formed into the pointing device housing; and
a key plate barrel formed into the key plate, wherein the key plate barrel is placed on the pin shaft to create the key plate hinge and allow the key plate to rotate about the pin shaft as limited by the pointing device housing.

17. The spring-back force adjustable pointing device of claim 15 further comprising:
a key plate trigger arm operatively coupled to the key plate to actuate a switch when the key plate is pressed down by a user.

18. The spring-back force adjustable pointing device of claim 15 further comprising:
a pointing device printed circuit board (PCB) include pointing device PCB circuitry that sends and receives data and power from an information handling system processor and power management unit (PMU), respectively, via a data and power line operatively coupled to the information handling system.

19. The spring-back force adjustable pointing device of claim 15 further comprising:
a battery; and
a network interface device operatively coupled to the battery to wirelessly couple the spring-back force adjustable pointing device to the information handling system.

20. The spring-back force adjustable pointing device of claim 15, wherein:
   the one or more additional magnets are a ferromagnet or an electromagnetic magnet; and
   the magnetic field produced by each of the one or more additional magnets and second magnet are different.

* * * * *